US006852816B2

(12) United States Patent
Lewis et al.

(10) Patent No.: US 6,852,816 B2
(45) Date of Patent: Feb. 8, 2005

(54) ZWITTERIONIC POLYMERS

(75) Inventors: Andrew Lennard Lewis, Surrey (GB); Sean Leo Willis, Surrey (GB); Steven Peter Armes, West Sussex (GB); Emma Janice Lobb, West Sussex (GB); Yinghua Ma, Surrey (GB)

(73) Assignee: Biocompatibles UK Limited, Farnham (GB)

( * ) Notice: Subject to any disclaimer, the term of this patent is extended or adjusted under 35 U.S.C. 154(b) by 0 days.

(21) Appl. No.: 10/398,400

(22) PCT Filed: Oct. 5, 2001

(86) PCT No.: PCT/GB01/04432

§ 371 (c)(1),
(2), (4) Date: Oct. 20, 2003

(87) PCT Pub. No.: WO02/28929

PCT Pub. Date: Apr. 11, 2002

(65) Prior Publication Data

US 2004/0063881 A1 Apr. 1, 2004

(30) Foreign Application Priority Data

Oct. 6, 2000 (EP) ............................................ 00308821

(51) Int. Cl.[7] ............................................ C08F 130/02
(52) U.S. Cl. ........................ 526/277; 526/91; 526/145; 526/146; 526/147; 526/161; 526/172; 526/193; 526/204; 526/213; 526/220; 526/222; 526/262; 526/287; 526/303.1; 526/310; 526/319; 524/710
(58) Field of Search .......................... 526/91, 145, 146, 526/147, 161, 172, 193, 204, 213, 220, 222, 262, 277, 287, 310, 303.1, 31; 524/710

(56) References Cited

U.S. PATENT DOCUMENTS 5,789,487 A 8/1998 Matyjaszewski et al.
5,807,937 A 9/1998 Matyjaszewski et al.

FOREIGN PATENT DOCUMENTS

| WO | WO 93/01221 | 1/1993 |
|----|----|----|
| WO | WO 94/16749 | 8/1994 |
| WO | WO 95/20407 | 8/1995 |
| WO | WO 96/30421 | 10/1996 |
| WO | WO 98/07758 | 2/1998 |
| WO | WO 98/22516 | 5/1998 |
| WO | WO 98/30615 | 7/1998 |
| WO | WO 98/40415 | 9/1998 |
| WO | WO 01/09208 A1 | 2/2001 |

OTHER PUBLICATIONS

Feng et al. Journal of polymer Science, Part A: Polymer Chemistry (2004), 42(12), 2931–2942.*
Miyamoto et al. Journal of Applied Polymer Science (2004), 91(2), 827–832.*
Oishi et al. Polymer Journal (Tokyo) (1998), 30(1), 17–22.*
Wang et al., "Facile synthesis of well–defined water–soluble polymers via atom transfer radical polymerization in aqueous media at ambient temperature," *Chem. Commun.*, (1999), pp. 1817–1818.
Wang et al., "Scope and Limitations of Atom Transfer Radical Polymerisation in Aqueous Media," *Polymer Preprints 2000*, vol. 41, No. 1, pp. 413–414.

* cited by examiner

*Primary Examiner*—Helen L. Pezzuto
(74) *Attorney, Agent, or Firm*—Sughrue Mion, PLLC

(57) ABSTRACT

Polymers may be made from zwitterionic monomers having controlled architectures and molecular weights, using living polymerisations such as group or atom transfer radical polymerisation. For instance polymers may be formed by atom transfer radical polymerisation using a copper chloride catalyst, a ligand which is water soluble, and a water soluble tertiary alkyl halide initiator to form homopolymers having controlled polydispersities of less than 1.5 and block copolymers with other hydrophilic or hydrophobic monomers. One suitable zwitterionic monomer is 2-methacryloyloxy-2'-trimethylammoniumethyl phosphate inner salt. The block copolymers may spontaneously form micelles, believed to have zwitterionic, for instance phosphorylcholine, groups at the external surface, which may be useful as drug delivery systems with improved biocompatibility.

39 Claims, 8 Drawing Sheets

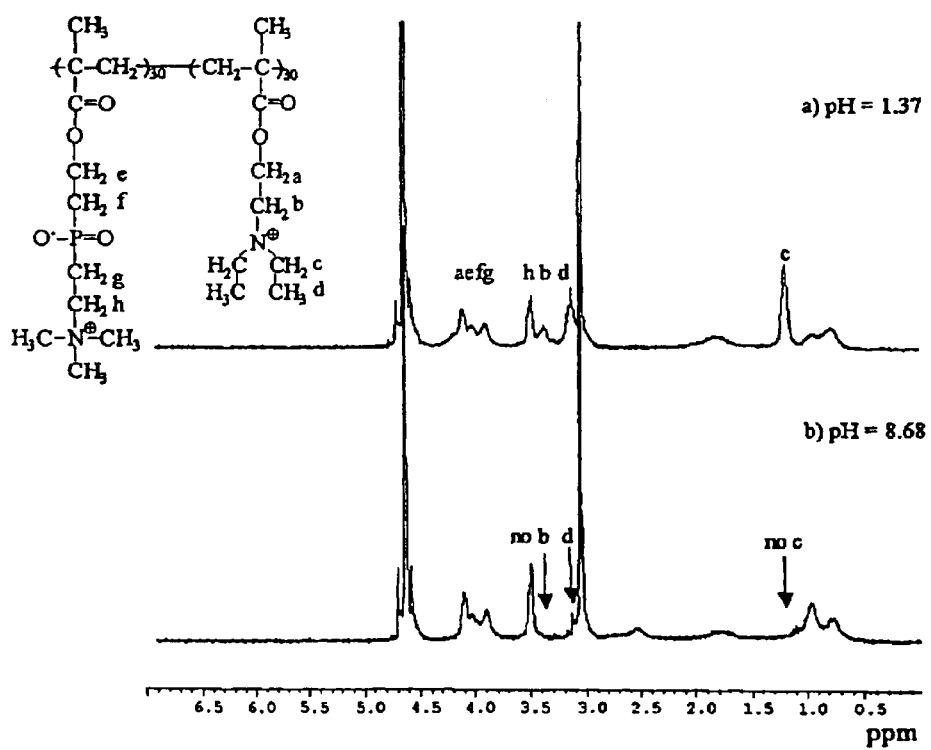
Fig. 8 Proton NMR spectra of Example 24 diblock copolymer obtained in $D_2O$ under the following conditions: a) pH 1.37, b) pH 8.68.

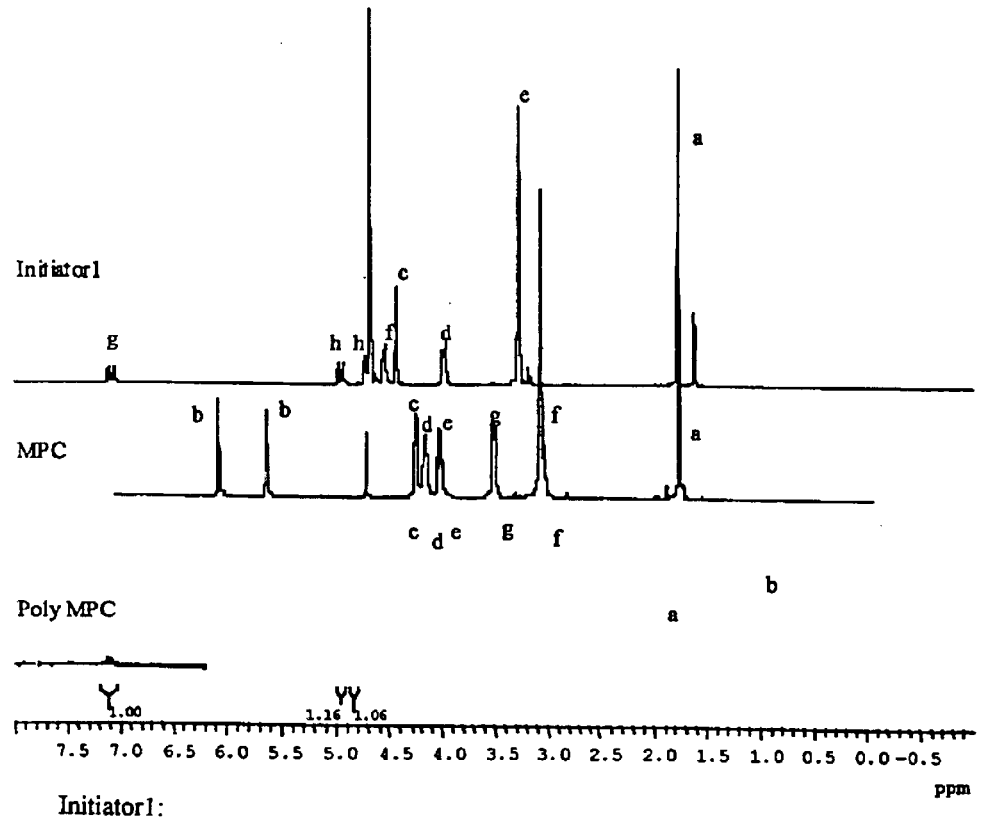
Initiator1:
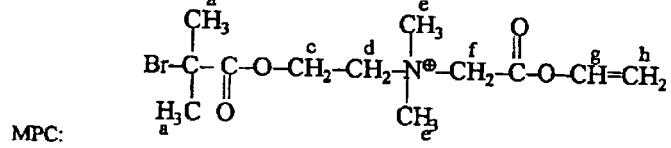
MPC:
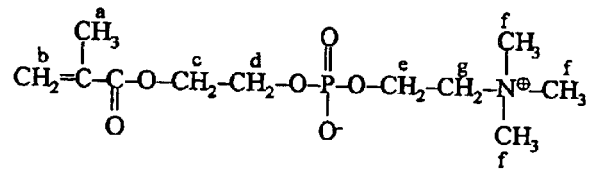
Fig.9  $^1$H NMR spectra of the vinyl acetate-functionalised initiator1, MPC monomer and MPC polymer.

ZWITTERIONIC POLYMERS

The present inventions relates to zwitterionic polymers having controlled architectures, specifically having controlled chain length and/or block chain length in block copolymers.

It is known that phosphorylcholine based polymers can be used to produce surfaces which are resistant to protein adsorption and blood and microbial cell adhesion. Copolymers of 2-methacryloyloxymethyl-2'-trimethylammonium ethyl phosphate inner salt (MPC) formed by solution polymerisation using thermal initiators such as azoisobutyronitrile are described in WO-A-9301221. Comonomers are selected to confer particular surface binding characteristics. For instance hydrophobic comonomers such as $C_{8-24}$-alkyl (meth)acrylate comonomers confer surface binding for hydrophobic surfaces. Reactive comonomers confer crosslinkability or covalent reactivity to surface functional groups. Ionic monomers confer electrostatic binding to oppositely charged surfaces. Various improvements have been described, for instance cationic comonomers have been used to provide additional desirable characteristics as described in WO-A-9822516. Improved crosslinking systems are described in WO-A-9830615.

The mixture of MPC and comonomers in the above specifications has reactivity ratios far from 1:1. In thermal (or redox) initiated radical polymerisations, the rate of propagation is very high compared to the rate of initiation. New initiator radicals are generated throughout the course of a polymerisation. Since one of the monomers is more reactive than the other(s), the composition of monomer available for polymerisation throughout a polymerisation process, and hence the composition of polymer molecules made throughout a process, varies. Whilst some compositional variation may be tolerated in some applications, and may even have benefit in terms of properties it conferred, it is often desirable to provide polymer having a narrower range of composition and molecular weight.

Some improvements in the compositional variation have been described in WO-A-9822516 and PCT/GB00/02078. The polymerisations were conducted under monomer starved conditions, by feeding a mixture of monomers over an extended period into the reaction vessel containing initiator. However these processes still produce polymers having a wide variation in terms of molecular weight (polydispersity).

Polymerisation methods for polymerising ethylenically unsaturated monomers to provide narrow polydispersities have been developed. One class of polymerisations use ionic living polymers. These are generally conducted in organic solvents (toluene, tetrahydrofuran) in which zwitterionic monomers, which tend to be highly hydrophilic, are insoluble. One type of living polymerisation, sometimes termed pseudo-living polymerisation, developed by Matyjaszewski is called atom transfer radical polymerisation (ATRP). The process is described inter alia in WO-A-96/30421, U.S. Pat. No. 5,807,937, WO-A-98140415, WO-A-9807758 and U.S. Pat. No. 5,789,487. All these polymerisations require a low stationary concentration of growing radicals, $M_n^*$, which are in a fast dynamic equilibrium with the dormant species, $M_nX$. This reduces the extent of termination reactions by two growing radicals joining together. The initiation reaction should be very fast compared to the rate of propagation. The reaction of growing radicals $M_n^*$ react reversibly with radicals X which, in ATRP are atoms, generally halogen atoms. In ATRP, the reversible reaction involves a transition metal compound which is able to change oxidation states. The general reaction scheme of atom and group transfer may be represented as follows:

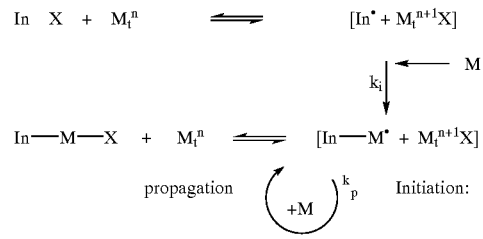

in which InX is the initiator compound, $M_t$ is the transition metal compound, which is convertable from n oxidation state to the n+1 oxidation state, and M is the monomer. Ki is the initiation rate constant, and $K_p$ is the propagation rate constant. The reactions involving the transition metal redox cycle are reversible. The rate constants of the various reactions result in relatively low stationary levels of the moiety In-$M_n^*$, since this reacts to form the dormant species In-M-X. The molecular weight increases linearly with increasing monomer conversion. In ATRP, ligands are generally present to complex the transition metal ions, generally in both oxidation states.

Most of Matyjaszewski's ATRP reactions are conducted in organic solvent. Recently X-S Wang et al., in Chem. Commun., 1999, 1817–1818 and in Polymer Preprint 2000, 41(1), 413–414, describe atom transfer radical polymerisations conducted in aqueous media involving water soluble ethylenically unsaturated monomers such as hydroxy ethyl methacrylate (HEMA), sodium methacrylate, sodium 4-vinylbenzoate, 2-aminoethylmethacrylate, 2-sulphatoethyl methacrylate ammonium salt, 3-sulphopropyl methacrylate potassium salt, N-(4-vinylbenzyl) trimethyl ammonium chloride and monomethoxy-capped oligo(ethylene oxide)methacrylate (OEGMA). The initiators used were water soluble bromine substituted compounds such as the reaction product of monomethoxy-capped oligo(ethylene oxide) with 2-bromoisobutyryl bromide (OEGBr), 4-bromo-α-toluic acid or ethyl 2-bromopropanoic acid, or 2-(N,N-dimethylamino) ethyl-2'-bromoisobutyrate. The reactions could be conducted at ambient temperatures, at which conversion rates of more than 95% were obtained after less than half an hour. Block copolymers could be formed by the use of the OEGMA-derived macro initiator for polymerising 2-sulphatoethyl methacrylate. Armes described polymerisation of a carboxybetaine monomer in similar systems at a conference in Cambridge, "Controlled free radical polymerisation" 21 Sep. 2000.

Haddleton, D. M. et al at 217th ACS National meeting, Anaheim Mar. 21–25, 1999, POLY-024, described catalytic chain transfer (CCT) polymerisations in aqueous solutions of acrylic monomers, such as 2-methacryloyloxy-2'-trimethylammonium ethyl phosphate, using a cobalt catalyst, cobaloxine boron fluoride. In CCTP the metal of the catalyst becomes directly joined (reversibly) to the growing polymer chain.

According to the present invention there is provided a new polymerisation process in which ethylenically unsaturated monomers including a zwitterionic monomer of the general formula I $$Y B X \qquad\qquad I$$

in which Y is an ethylenically unsaturated group selected from $H_2C{=}CR{-}CO{-}A^1{-}$, $H_2C{=}CR{-}C_6H_4{-}A^1{-}$, $H_2C=CR-CH^2A^2$, $R^2O-CO-CR=CR-CO-O$, $RCH=CH-CO-O-$, $RCH=C(COOR^2)CH_2-CO-O$,

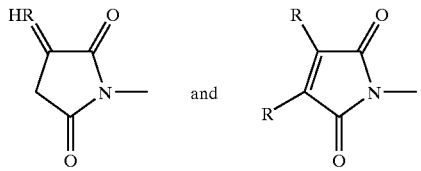

and

A is —O— or $NR^1$;
$A^1$ is selected from a bond, $(CH_2)_nA^2$ and $(CH_2)_n SO_3$— in which n is 1 to 12;
$A^2$ is selected from a bond, —O—, O—CO—, CO—O, CO—$NR^1$—, —$NR^1$—CO, O—CO—$NR^1$—, $NR^1$—CO—O—;
R is hydrogen or $C_{1-4}$ alkyl;
$R^1$ is hydrogen, $C_{1-4}$-alkyl or BX;
$R^2$ is hydrogen or $C_{1-4}$ alkyl;
B is a bond, or a straight branched alkanediyl, alkylene oxaalkylene, or alkylene (oligooxalkylene) group, optionally containing one or more fluorine substituents;
X is an ammonium, phosphonium, or sulphonium phosphate or phosphonate ester zwitterionic group,
are polymerised by a living radical polymerisation process in the presence of an initiator, and a catalyst.

The zwitterionic group X, in this aspect of the invention, comprises as the cationic moiety, and ammonium, phosphonium or sulphonium group. Preferably the cation is an ammonium group. The anion of the zwitterion is a phospho moiety. It is generally a phosphate diester, or a phosphonate ester based moiety. Generally in the zwitterionic group X, the anion is closer to B than the cation. However in some zwitterions, the cation is closer to the group B than is the anion (called hereinafter phosphobetaines).

Preferably X is a group of the general formula II

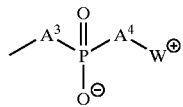

II in which the moieties $A^3$ and $A^4$, which are the same or different, are —O—, —S—, —NH— or a valence bond, preferably —O—, and $W^+$ is a group comprising an ammonium, phosphonium or sulphonium cationic group and a is group linking the anionic and cationic moieties which is preferably a $C_{1-12}$-alkanediyl group,
preferably in which $W^+$ is a group of formula —$W^1$—$N^+R^3_3$, —$W^1$—$P^+R^4_3$, —$W^1$—$S^+R^4_2$ or —$W^1$-$Het^+$ in which:

$W^1$ is alkanediyl of 1 or more, preferably 2–6 carbon atoms optionally containing one or more ethylenically unsaturated double or triple bonds, disubstituted-aryl (arylene), alkylene arylene, arylene alkylene, or alkylene aryl alkylene, cycloalkanediyl, alkylene cycloalkyl, cycloalkyl alkylene or alkylene cycloalkyl alkylene, which group $W^1$ optionally contains one or more fluorine substituents and/or one or more functional groups; and
either the groups $R^3$ are the same or different and each is hydrogen or alkyl of 1 to 4 carbon atoms, preferably methyl, or aryl, such as phenyl, or two of the groups $R^3$ together with the nitrogen atom to which they are attached form an aliphatic heterocyclic ring containing from 5 to 7 atoms, or the three groups $R^3$ together with the nitrogen atom to which they are attached form a fused ring structure containing from 5 to 7 atoms in each ring, and optionally one or more of the groups $R^3$ is substituted by a hydrophilic functional group, and
the groups $R^4$ are the same or different and each is $R^3$ or a group $OR^3$, where $R^3$ is as defined above; or
Het is an aromatic nitrogen-, phosphorus- or sulphur-, preferably nitrogen-, containing ring, for example pyridine.

Monomers in which X is of the general formula in which $W^+$ is $W^1N^*R^3_3$ may be made as described in our earlier specification WO-A-9301221. Phosphonium and sulphonium analogues are described in WO-A-9520407 and WO-A-9416749.

Generally a group of the formula II has the preferred general formula III

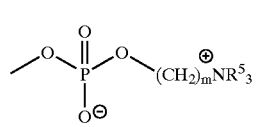

III where the groups $R^5$ are the same or different and each is hydrogen or $C_{1-4}$ alkyl, and m is from 1 to 4, in which preferably the groups $R^5$ are the same preferably methyl.

In phosphobetaine based groups, X may have the general formula IV

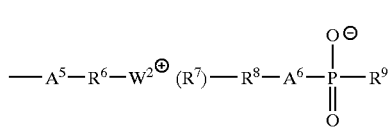

IV in which $A^5$ is a valence bond, —O—, —S— or —NH—, preferably —O—;
$R^6$ is a valence bond (together with $A^5$) or alkanediyl, —C(O)alkylene- or —C(O)NH alkylene preferably alkanediyl, and preferably containing from 1 to 6 carbon atoms in the alkanediyl chain;
$W^2$ is S, $PR^7$ or $NR^7$;
the or each group $R^7$ is hydrogen or alkyl of 1 to 4 carbon atoms or the two groups $R^7$ together with the heteroatom to which they are attached form a heterocyclic ring of 5 to 7 atoms;
$R^8$ is alkanediyl of 1 to 20, preferably 1 to 10, more preferably 1 to 6 carbon atoms;
$A^6$ is a bond, NH, S or O, preferably O; and
$R^9$ is a hydroxyl, $C_{1-12}$ alkyl, $C_{1-12}$ alkoxy, $C_{7-18}$ aralkyl, $C_{7-18}$-aralkoxy, $C_{6-18}$ aryl or $C_{6-18}$ aryloxy group.

Monomers comprising a group of the general formula IV may be made by methods as described in JP-B-03031718, in which an amino substituted monomer is reacted with a phospholane.

In compounds comprising a group of the general formula IV, it is preferred that
$A^5$ is a bond;
$R^6$ is a $C_{2-6}$ alkanediyl;
$W^2$ is $NR^7$:
each $R^7$ is $C_{1-4}$ alkyl;
$R^8$ is $C_{2-8}$ alkanediyl;
$A^6$ is O; and
$R^9$ is $C_{1-4}$ alkoxy.

In the zwitterionic monomer of the general formula I it is preferred that the ethylenic unsaturated group Y is $H_2C=CR-CO-A$-. Such acrylic moieties are preferably methacrylic, that is in which R is methyl, or acrylic, in which R is hydrogen. Whilst the compounds may be (meth) acrylamido compounds (in which A is $NR^1$), in which case $R^1$ is preferably hydrogen, or less preferably, methyl, most preferably the compounds are esters, that is in which A is O.

In monomers of the general formula I, especially where Y is the preferred (alk)acrylic group, B is most preferably an alkanediyl group. Whilst some of the hydrogen atoms of such group may be substituted by fluorine atoms, preferably B is an unsubstituted alkanediyl group, most preferably a straight chain group having 2 to 6 carbon atoms.

A particularly preferred zwitterionic monomer is 2-methacryloyloxyethyl-2'-trimethylammonium ethyl phosphate inner salt.

In the polymerisation process, the ethylenically unsaturated monomers may further include a comonomer. Comonomers are copolymerisable with the zwitterionic monomer and are preferably selected from anionic, cationic and nonionic monomers. It is generally preferred that the monomer mixture include at least one nonionic monomer. Another class of comonomer is a cross-linking monomer having a functional group which may be cured after polymerisation to cross-link the polymer.

Examples of suitable comonomers are compounds of the general formula X

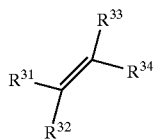

X in which $R^{31}$ is selected from hydrogen, halogen, $C_{1-4}$ alkyl and groups $COOR^2$ in which $R^2$ is hydrogen and $C_{1-4}$ alkyl;

$R^{32}$ is selected from hydrogen, halogen and $C_{1-4}$ alkyl;

$R^{33}$ is selected from hydrogen, halogen, $C_{1-4}$ alkyl and groups $COOR^2$ is provided that $R^{31}$ and $R^{33}$ are not both $COOR^2$; and $R^{34}$ is a $C_{1-10}$ alkyl, a $C_{1-20}$ alkoxycarbonyl, a mono-or di-($C_{1-20}$ alkyl) amino carbonyl, a $C_{6-20}$ aryl (including alkaryl) a $C_{7-20}$ aralkyl, a $C_{6-20}$ aryloxycarbonyl, a $C_{1-20}$-aralkyloxycarbonyl, a $C_{6-20}$ arylamino carbonyl, a $C_{7-20}$ aralkyl-amino, a hydroxyl or a $C_{2-10}$ acyloxy group, any of which may have one or more substituents selected from halogen atoms, alkoxy, oligo-alkoxy, aryloxy, acyloxy, acylamino, amine (including mono and di-alkyl amino and trialkylammonium in which the alkyl groups may be substituted), carboxyl, sulphonyl, phosphoryl, phosphino, (including mono- and di-alkyl phosphine and trialkylphosphonium), zwitterionic, hydroxyl groups, vinyloxycarbonyl and other vinylic or allylic substituents, and reactive silyl or silyloxy groups, such as trialkoxysilyl groups;

or $R^{34}$ and $R^{33}$ or $R^{34}$ and $R^{32}$ may together form —$CONR^{35}CO$ in which $R^{35}$ is a $C_{1-20}$ alkyl group.

It is preferred for at least two of the groups $R^{31}$ $R^{32}$ $R^{33}$ and $R^{34}$ to be halogen or, more preferably, hydrogen atoms. Preferably $R^{31}$ and $R^{32}$ are both hydrogen atoms. It is particularly preferred that compound of general formula X be a styrene-based or acrylic based compound. In styrene based compounds $R^{34}$ represents an aryl group, especially a substituted aryl group in which the substituent is an amino alkyl group, a carboxylate or a sulphonate group. Where the comonomer is an acrylic type compound, $R^{34}$ is an alkoxycarbonyl, an alkyl amino carbonyl, or an aryloxy carbonyl group. Most preferably in such compounds $R^{34}$ is a $C_{1-20}$-alkoxy carbonyl group, optionally having a hydroxy substituent. Acrylic compounds are generally methacrylic in which case $R^{33}$ is methyl.

Where a comonomer is included in the polymerisation process of the invention, the molar ratio of zwitterionic monomer to comonomer is preferably in the range 1:50 to 50:1, more preferably in the range 1:10 to 10:1, more preferably in the range 1:5 to 1:1.

The living radical polymerisation process of the invention may be a group transfer radical polymerisation, for instance in which an N→O, or other carbon-, sulphur-, and oxygen-centered radical group is transferred from an initiator compound to a monomer. Preferably, however, the process is an atom transfer radical polymerisation process.

In the atom or group transfer radical polymerisation process, the initiator has a radically transferable atom or group, and the catalyst comprises a transition metal compound and a ligand, in which the transition metal compound is capable of participating in a redox cycle with the initiator and dormant polymer chain, and the ligand is either any N—, O—, P—or S— containing compound which can-coordinate with the transition metal atom in a σ-bond, or any carbon-containing compound which can coordinate with the transition metal in a π-bond, such that direct bonds between the transition metal and growing polymer radicals and not formed.

Preferably the radical initiator is of the general formula V $$R^{11}R^{12}R^{13}C—X^2 \quad\quad V$$

where:

$X^2$ is selected from the group consisting of Cl, Br, I, $OR^{10}$, $SR^{14}$, $SeR^{14}$, $OP(=O)R^{14}$, $OP(=O)(OR^{14})_2$; $O—N(R^{14})_2$ and $S—C(=S)N(R^{14})_{23}$ where $R^{10}$ is alkyl of from 1 to 20 carbon atoms in which each of the hydrogen atoms may be independently replaced by halide, $R^{14}$ is aryl or a straight or branched $C_1–C_{20}$ alkyl group, and where an $N(R^{14})_2$ group is present, the two $R^{14}$ groups may be joined to form a 5- or 6-membered heterocyclic ring; and $R^{11}$, $R^{12}$ and $R^{13}$ are each independently selected from the group consisting of H, halogen, $C_1–C_{20}$ alkyl, $C_3–C_8$ cycloalkyl, $C(=O)R^{15}$, $C(=O)NR^{16}R^{17}$, COCl, OH, CN, $C_2–C_{20}$ alkenyl, $C_2–C_{20}$ alkenyl oxiranyl, glycidyl, aryl, heterocyclyl, aralkyl, aralkenyl, $C_1–C_6$ alkyl in which from 1 to all of the hydrogen atoms are replaced with halogen, $C_1–C_6$ alkyl substituted with from 1 to 3 substituents selected from the group consisting of $C_1–C_4$ alkoxy, aryl, heterocyclyl, $C(=O)R^{15}$, $C(=O)NR^{16}R^{17}$, —$CR^{12}R^{13}X^2$ oxiranyl and glycidyl;

where $R^{15}$ is alkyl of from 1 to 20 carbon atoms, alkoxy of from 1 to 20 carbon atoms, oligo(alkoxy) in which each alkoxy group has 1 to 3 carbon atoms, aryloxy or heterocyclyloxy any of which groups may have substituents selected from optionally substituted alkoxy, oligoalkoxy, amino (including mono- and di-alkyl amino and trialkyl ammonium, which alkyl groups, in turn may have substituents selected from acyl, alkoxycarbonyl, alkenoxycarbonyl, aryl and hydroxy) and hydroxyl groups; and $R^{16}$ and $R^{17}$ are independently H or alkyl of from 1 to 20 carbon atoms which alkyl groups, in turn may have substituents selected from acyl, alkoxycarbonyl, alkenoxycarbonyl, aryl and hydroxy, or $R^{16}$ and $R^{17}$ may be joined together to form an alkanediyl group of from 2 to 5 carbon atoms, thus forming a 3- to 6-membered ring;

such that not more than two of $R^{11}$, $R^{12}$ and $R^{13}$ are H.

In the initiator of the general formula V it is preferred that no more than one of $R^{11}$, $R^{12}$ and $R^{13}$, and preferably none, is hydrogen. Suitably at least one, and preferably both of $R^{11}$ and $R^{12}$ is methyl. $R^{13}$ is suitably a group CO—$R^{15}$ in which $R^{15}$ is preferably alkoxy of from 1 to 20 carbon atoms, oligo(alkoxy) in which each alkoxy group has 1 to 3 carbon atoms, aryloxy or heterocyclyloxy any of which groups may have substituents selected from optionally substituted alkoxy, oligoalkoxy, amino (including mono- and di-alkyl amino and trialkyl ammonium, which alkyl groups, in turn may have substituents selected from acyl, alkoxycarbonyl, alkenoxycarbonyl, aryl and hydroxy) and hydroxyl groups.

Since any of $R^{11}$, $R^{12}$ and $R^{13}$ may comprise a substituent $C^{12}R^{13}X^2$, the initiator may be di-, oligo- or poly-functional.

Selection of a suitable initiator is based on various considerations. Where the polymerisation is carried out in the liquid phase, in which the monomers are dissolved, it is preferable for the initiator to be soluble in that liquid phase. The initiator is thus selected for its solubility characteristics according to the solvent system which in turn is selected according to the monomers being polymerised. Also the choice of monomer will affect the polymer architecture. Star, comb, block or linear polymers may be selected by choice of a suitable initiator. A star initiator could be synthesised from a halogenated sugar. A comb initiator could be based on a polymer with pendant halogenated groups. Water-soluble initiators include, for instance the reaction product of monomethoxy-capped oligo(ethylene oxide) with 2-bromoisobutyryl bromide (OEGBr), 4-bromo-α-toluic acid or ethyl 2-bromopropanoic acid or 2-(N,N-dimethylamino) ethyl-2'-bromoisobutyrate.

From the general reaction scheme shown above, it is clear that the portion of the initiator —C—$R^{11}R^{12}R^{13}$ becomes joined to the first monomer of the growing polymer chain. The group $X^2$ becomes joined to the terminal unit of the polymer chain. Selection of a suitable initiator is determined in part by whether a terminal group having particular characteristics is required for subsequent functionality. Subsequent reactions of the product polymer are described below.

In the atom or group radical transfer polymerisation process the transition metal compound which comprises a component of the catalyst is $M_t^{n+}X'_n$, where:

$M_t^{n+}$ may be selected from the group consisting of $Cu^{1+}$, $Cu^{2+}$, $Fe^{2+}$, $Fe^{3+}$, $Ru^{2+}$, $Ru^{3+}$, $Cr^{2+}$, $Cr^{3+}$, $Mo^{2+}$, $Mo^{3+}$, $W^{2+}$, $W^{3+}$, $Mn^{2+}$, $Mn^{3+}$, $Mn^{4+}$, $Rh^{3+}$, $Rh^{4+}$, $Re^{2+}$, $Re^{3+}$, $Co^+$, $Co^{2+}$, $Co^{3+}$, $V^{2+}$, $V^{3+}$, $Zn^+$, $Zn^{2+}$, $Ni^{2+}$, $Ni^{3+}$, $Au^+$, $Au^{2+}$, $Ag^+$ and $Ag^{2+}$;

X' is selected from the group consisting of halogen, $C_1$–$C_6$-alkoxy, $(SO_4)_{1/2}$, $(PO_4)_{1/3}$, $(R^{18}PO_4)_{1/2}$, $(R^{18}_2PO_4)$, triflate, hexafluorophosphate, methanesulphonate, arylsulphonate, CN and $R^{19}CO_2$, where $R^{18}$ is aryl or a straight or branched $C_{1-20}$ alkyl and $R^{19}$ is H or a straight or branched $C_1$–$C_6$ alkyl group which may be substituted from 1 to 5 times with a halogen; and n is the formal charge on the metal ($0 \leq n \leq 7$).

Preferably X' is halide, most preferably chloride or bromide. Particularly suitable transition metal compounds are based on copper or ruthenium, for instance CuCl or $RuCl_2$.

In the catalyst, the ligand is preferably selected from the group consisting of:

a) compounds of the formulas:

$R^{20}$-Z-$R^{21}$ and $R^{20}$-Z-$(R^{22}$-Z$)_m$—$R^{21}$ where:

$R^{20}$ and $R^{21}$ are independently selected from the group consisting of H, $C_1$–$C_{20}$ alkyl, aryl, heterocyclyl and $C_1$–$C_6$ alkoxy, $C_1$–$C_4$ dialkylamino, C(=O)$R^{22}$, C(=O)$R^{23}R^{24}$ and $A^7C(=O)R^{25}$, where $A^7$ may be $NR^{26}$ or O; $R^{22}$ is alkyl of from 1 to 20 carbon atoms, aryloxy or heterocyclyloxy; $R^{23}$ and $R^{24}$ are independently H or alkyl of from 1 to 20 carbon atoms or $R^{23}$ and $R^{24}$ may be joined together to form an alkanediyl group of from 2 to 5 carbon atoms, thus forming a 3- to 6-membered ring; $R^{25}$ is H, straight or branched $C_1$–$C_{20}$ alkyl or aryl and $R^{26}$ is hydrogen, straight or branched; $C_{1-20}$-alkyl or aryl; or $R^{20}$ and $R^{21}$ may be joined to form, together with Z, a saturated or unsaturated ring;

Z is O, S, $NR^{27}$ or $PR^{27}$, where $R^{27}$ is selected from the same group as $R^{20}$ and $R^{21}$, and where Z is $PR^{27}$, $R^{27}$ can also $C_1$–$C_{20}$ alkoxy or Z may be a bond, $CH_2$ or a fused ring, where one or both of $R^{20}$ and $R^{21}$ is heterocyclyl, each $R^{22}$ is independently a divalent group selected from the group consisting of $C_1$–$C_8$ cycloalkanediyl, $C_1$–$C_8$ cycloalkenediyl, arenediyl and heterocyclylene where the covalent bonds to each Z are at vicinal positions or $R^{22}$ may be joined to one or both of $R^{20}$ and $R^{21}$ to formulate a heterocyclic ring system; and m is from 1 to 6;

b) CO;

c) porphyrins and porphycenes, which may be substituted with from 1 to 6 halogen atoms, $C_{1-6}$ alkyl groups, $C_{1-6}$-alkoxy groups, $C_{1-6}$ alkoxycarbonyl, aryl groups, heterocyclyl groups, and $C_1$ alkyl groups further substituted with from 1 to 3 halogens;

d) compounds of the formula $R^{23}R^{24}C(C(=O)R^{25})_2$, where $R^{25}$ is $C_{1-20}$ alkyl, $C_{1-20}$ alkoxy, aryloxy or heterocyclyloxy; and each of $R^{23}$ and $R^{24}$ is independently selected from the group consisting of H, halogen, $C_{1-20}$ alkyl, aryl and heterocyclyl, and $R^{23}$ and $R^{24}$ may be joined to form a $C_{1-8}$ cycloalkyl ring or a hydrogenated aromatic or heterocyclic ring, of which the ring atoms may be further substituted with 1 to 5 $C_{1-6}$ alkyl groups, $C_{1-6}$ alkoxy groups, halogen atoms, aryl groups, or combinations thereof; and e) arenes and cyclopentadienyl ligands, where said cyclopentadienyl ligand may be substituted with from one to five methyl groups, or may be linked through and ethylene or propylene chain to a second cyclopentadienyl ligand.

Selection of a suitable ligand is, for instance, based upon the solubility characteristics and/or the separability of the catalyst from the product polymer mixture. Generally it is catalyst to be soluble in a liquid reaction mixture, although under some circumstances it may be possible to immobilise the catalyst, for instance an a porous substrate. For the preferred process, which is carried out in the liquid phase, the ligand is soluble in a liquid phase. The ligand is generally a nitrogen containing ligand. The preferred ligand maybe a compound including a pyridyl group and an imino moiety, such as bipyridine, or

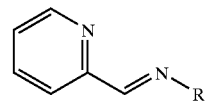

where R is a suitable alkyl group, the substituent being variable and adaptable to confer desired solubility characteristics or may be triphenylphosphine or 1,1,4,7,10,10-hexamethyl-triethylene tetramine.

Such ligands are usefully used in combination with copper chloride and ruthenium chloride transition metal compounds as part of the catalyst.

The living radical polymerisation process of the invention is preferably carried out to achieve a degree of polymerisation in the range 5 to 500. Preferably the degree of polymerisation is in the range 10 to 100, more preferably in the range 10 to 50. In the preferred group or atom transfer radical polymerisation technique, the degree of polymerisation is directly related to the initial ratios of initiator to monomer. Preferably the ratio is in the range 1:(5 to 500), more preferably in the range of 1:(10 to 100), most preferably in the range 1:(10 to 50).

The ratio of metal compound and ligand in the catalyst should be approximately stoichiometric, based on the ratios of the components when the metal ion is-fully complexed. The ratio should preferably be in the range 1:(0.5 to 2) more preferably in the range 1:(0.8:1.25). Preferably the range is about 1:1.

In the process, the catalyst may be used in amounts such that a molar equivalent quantity as compared to the level of initiator is present. However, since catalyst is not consumed in the reaction, it is generally not essential to include levels of catalyst as high as of initiator. The ratio of catalyst (based on transition metal compound) to initiator is preferably in the range 1:(1 to 50), more preferably in the range 1:(1 to 10).

Whilst the polymerisation reaction may be carried out in the gaseous phase, it is more preferably carried out in the liquid phase. The reaction may be heterogeneous, that is comprising a solid and a liquid phase, but is more preferably homogeneous. Preferably the polymerisation is carried out in a single liquid phase. Where the monomer is liquid, it is sometimes unnecessary to include a non-polymerisable solvent. More often, however, the polymerisation takes place in the presence of a non-polymerisable solvent. The solvent should be selected having regard to the nature of the zwitterionic monomer and any comonomer, for instance for its suitability for providing a common solution containing both monomers. The solvent may comprise a single compound or a mixture of compounds.

It has been found that, especially where the zwitterionic monomer is MPC, that it is desirable to include water in the polymerisation mixture. Preferably water should be present in an amount in the range 10 to 100% by weight based on the weight of ethylenically unsaturated monomer. Preferably the total non-polymerisable solvent comprised 1 to 500% by weight based on the weight of ethylenically unsaturated monomer. It has been found that the zwitterionic monomer and water should be in contact with each other for as short a period as possible prior to contact with the initiator and catalyst. It may be desirable therefore for all the components of the polymerisation other than the zwitterionic monomer to be premixed and for the zwitterionic monomer to be added to the premix as the last additive.

It is often desired to copolymerise MPC or other zwitterionic monomer with a comonomer which is insoluble in water. In such-circumstances, a solvent or co-solvent (in conjunction with water) is included to confer solubility on both MPC and the more hydrophobic monomer. Suitable organic solvents are ethers, esters and, most preferably, alcohols. Especially where a mixture of organic solvent and water is to used, suitable alcohols are $C_{1-4}$-alkanols. Methanol is found to be particularly suitable in the polymerisation process of the invention.

The process may be carried out at raised temperature, for instance up to 60 to 80° C. However it has been found that the process proceeds sufficiently fast at ambient temperature.

The polymerisation process of the invention has been found to provide polymers of zwitterionic monomers having a polydispersity (of molecular weight) of less than 1.5, as judged by gel permeation chromatography. Polydispersities in the range 1.2 to 1.4 have been achieved. Conversion rates achieved in the process are over 90% often over 95% or higher. It is preferred that the process be continued until a conversion level of at least 50%, or usually, at least 70% is reached.

It is believed that this process is the first time that low polydispersity polymers have been formed of monomers of the general formula I and such polymers form a further aspect of the invention.

Such polymers are preferably made by the living radical polymerisation process of the first aspect of the invention. Other controlled polymerisation techniques may be used for instance NO group transfer: systems such as are described in WO-A-0018807, catalyst systems described in WO-A-9958588, systems involving irradiation with visible light, or other EM radiation such as described in WO-A-99/10387, radical addition fragmentation chain transfer polymerisation (RAFT) as described in Rizzardo, E. et al. ACS Symposium Series 2000, 768, 278–296, using compounds (initiators) of the general type Z-C=SSR or macromolecular design through interchange of xanthes (MADIX) as described by Bontevin, B., J. Polym. Sci. PtA, Polym. Chem., 2000, 38(18), 3235–3243.

The polymer product of the polymerisation process of the invention may be a useful product as such. It may be desirable to deactivate or functionalise the terminal groups, that is the $CR^{11}R^{12}R^{13}$ and/or $X^2$ groups. The presence of such groups in the final polymer may provide useful functionality for subsequent chemical reactions. For instance tertiary amine substituents in such groups may be quaternised, ethylenic groups may be polymerised, and crosslinkable groups may be cured.

The product polymer may be a useful intermediate for forming block copolymers. A product polymer having a single terminal group $X^2$ may be used as an initiator in a second group or atom transfer radical polymerisation step carried out in the presence of a catalyst, and additional ethylenically unsaturated monomer. The product will be a block copolymer of the A-B type. The second block may be of the same or, more usefully, a different composition to that of the initial block A. The monomers from which block A and block B are formed may comprise the same component but in different ratios. More often they comprise different monomers, although they may include common comonomers. A second block, for instance added to a block A formed from zwitterionic monomer, may comprise ionic monomer or nonionic monomer. Nonionic monomer may be selected so as to confer hydrophobicity or control the hydrophilicity of the block copolymer. Suitable monomers used in a second living polymerisation step may include monomers of the general formula V, defined above. Comonomers may be selected to confer biodegradability upon the block copolymers.

A block copolymer of the A-B-A type may be produced where the initiator of a first step living polymerisation was difunctional, generating a single block B having two terminal groups $X^2$ (and a unit derived from the initiator partway along the backbone). In the second living polymerisation step, blocks of A will be added at each end of the initial polymer product. Alternatively, block copolymers having a star type architecture may be generated starting from a multifunctional initiator in the first step producing a star intermediate having, at each terminal, a $X^2$ group, from which the second step polymerisation propagates.

According to a second aspect of the invention there is provided a block copolymer of the A-B or A-B-A type in which A and B are the same or, preferably, different, in which at least one of the A and B is formed from ethylenically unsaturated monomer including a zwitterionic monomer of the general formula VI $$Y B X^1 \quad \quad VI$$

in which Y is an ethylenically unsaturated group selected from $H_2C=CR-CO-A-$, $H_2C=CR-C_6H_4-A^1-$, $H_2C=CR-CH_2A^2$, $R^2O-CO-CR=CR-CO-O$, $RCH=CH-CO-O-$, $RCH=C(COOR^2)CH_2-CO-O$,

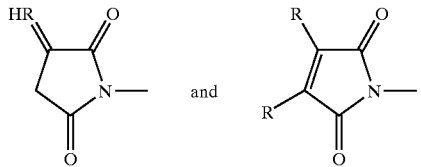

A is —O— or $NR^1$;
$A^1$ is selected from a bond, $(CH_2)_nA^2$ and $(CH_2)_n SO_3$— in which n is 1 to 12;
$A^2$ is selected from a bond —O—, O—CO—, CO—O, CO—$NR^1$—, —$NR^1$—CO, O—CO—$NR^1$—, $NR^1$—CO—O—;
R is hydrogen or $C_{1-4}$ alkyl;
$R^1$ is hydrogen, $C_{1-4}$ alkyl or BX;
$R^2$ is hydrogen or $C_{1-4}$ alkyl;
B is a bond, or a straight branched alkanediyl, alkylene oxaalkylene, or alkylene (oligooxalkylene) group, optionally containing one or more fluorine substituents; and
$X^1$ is a zwitterionic group.

In this aspect of the invention, the zwitterionic group $X^1$ may be a group X as defined in the first aspect of the invention. Alternatively it may be a zwitterion in which the anion comprises a sulphate, sulphonate or carboxylate group.

One class of zwitterions are sulphobetaines groups, for instance of the general formula XI.

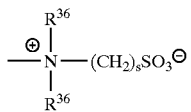

where the groups $R^{36}$ are the same or different and each is hydrogen or $C_{1-4}$ alkyl and s is from 2 to 4.

Preferably the groups $R^{36}$ are the same. It is also preferable that at least one of the groups $R^{36}$ is methyl, and more preferable that the groups $R^{36}$ are both methyl.

Preferably s is 2 or 3, more preferably 3.

Alternatively the zwitterionic group may be an amino acid moiety in which the alpha carbon atom (to which an amine group and the carboxylic acid group are attached) is joined through a linker group to the backbone of the biocompatible polymer. Such groups may be represented by the general formula XII

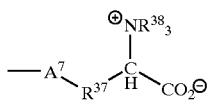

in which $A^7$ is a valence bond, —O—, —S— or —NH—, preferably —O—,
$R^{37}$ is a valence bond (optionally together with $A^7$) or alkanediyl, —C(O)alkylene- or —C(O)NHalkylene, preferably alkanediyl and preferably containing from 1 to 6 carbon atoms; and the groups $R^{38}$ are the same or different and each is hydrogen or alkyl of 1 to 4 carbon atoms, preferably-methyl, or two or three of the groups $R^{38}$, together with the nitrogen to which they are attached, form a heterocyclic ring of from 5 to 7 atoms, or the three group $R^{38}$ together with the nitrogen atom to which they are attached form a fused ring heterocyclic structure containing from 5 to 7 atoms in each ring.

Alternatively the zwitterion may be a carboxy betaine $-N^{\oplus}(R^{39})_2(CH_2)_rCOO^{\ominus}$ in which the $R^{39}$ groups are the same or different and each is hydrogen or $R_{1-4}$ alkyl and r is 2 to 6, preferably 2 or 3.

In this aspect of the invention it may either be the first formed block which comprises zwitterionic monomer, or the second formed block. It is preferred that either or both blocks are formed by living polymerisation techniques, that is that the population of polymers should have a low spread of block sizes, and of overall polydispersity of weight. Preferably both blocks are formed by atom or group transfer radical polymerisation. At least one of the steps of a two step process is that a polymerisation process according to the first aspect of the invention, namely the step in which the ethylenically unsaturated monomers include zwitterionic monomer. In a two step polymerisation both being carried out by atoms or group radical transfer, the group or atom transferred, as the case may be, will be the same in the two step. The transferable group which is the terminal group of the polymer product of the first step is transferred to a transition metal compound in the initiation of the second step. Generally it is convenient to use the same catalyst. In some circumstances, however, it may be necessary to use a different catalyst, for instance a different transition metal compound or ligand, or both, if the environment in the second step of the polymerisation is very different from that of the first step. For instance where the monomers in the second step require selection of a different solvent to solubilise the components, a different catalyst may be selected. Accordingly it may be necessary to isolate the polymer intermediate of step one from the catalyst, prior to providing the reaction mixture for step two. Suitable separation methods involve, for instance, chromatographic techniques such as gel permeation or precipitation etc. Preferably, however, the product of step one, in its entirety, forms part of the reaction mixture for step two.

The intermediate polymer produced by the process of the first aspect of the invention may be a useful commercial product in its own right, for instance having utility as an initiator for group or atom transfer radical polymerisations. Alternatively the terminating groups derived from the is initiator may be subjected to derivatisation reactions to introduce useful functionalities such as ionic groups and/or ethylenically unsaturated groups.

According to a further aspect of the invention there is provided a novel polymer of the formula VIII

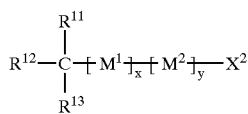

in which $X^2$ is selected from the group consisting of Cl, Br, I, $OR^{10}$, $SR^{14}$, $SeR^{14}$, $OP(=O)R^{14}$, $OP(=O)(OR^{14})_2$, O—$N(R^{14})_2$ and S—$C(=S)N(R^{14})_2$, where $R^{10}$ is alkyl of from 1 to 20 carbon atoms in which each of the hydrogen atoms may be independently replaced by halide, $R^{14}$ is aryl or a straight or branched $C_1-C_{20}$ alkyl group, and where an $N(R^{14})_2$ group is present, the two $R^{14}$ groups may be joined to form a 5 or 6-membered heterocyclic ring; and $R^{11}$, $R^{12}$ and $R^{13}$ are each independently selected from the group consisting of H, halogen, $C_1$–$C_{20}$ alkyl, $C_3$–$C_8$ cycloalkyl, $C(=O)R^{15}$, $C(=O)NR^{16}R^{17}$, COCl, OH, CN, $C_2$–$C_{20}$ alkenyl, $C_2$–$C_{20}$ alkenyl oxiranyl, glycidyl, aryl, heterocyclyl, aralkyl, aralkenyl, $C_1$–$C_6$ alkyl in which from 1 to all of the hydrogen atoms are replaced with halogen, and $C_1$–$C_6$ alkyl substituted with from 1 to 3 substituents selected from the group consisting of $C_1$–$C_4$ alkoxy, aryl, heterocyclyl, $C(=O)R^{15}$, $C(=R)NR^{16}R^{17}$, $-CR^{12}R^{13}X^2$, oxiranyl and glycidyl;

where $R^{15}$ is alkyl of from 1 to 20 carbon atoms, alkoxy of from 1 to 20 carbon atoms, oligo(alkoxy) in which each alkoxy group has 1 to 5 carbon atoms, aryloxy or heterocyclyloxy any of which groups may have substituents selected from optionally substituted alkoxy, oligoalkoxy, amino (including mono- and di-alkyl amino and trialkyl ammonium, which alkyl groups, in turn may have substituents selected from acyl, alkoxycarbonyl, alkenoxycarbonyl, aryl and hydroxy) and hydroxyl groups; and $R^{16}$ and $R^{17}$ are independently H or alkyl of from 1 to 20 carbon atoms which alkyl groups, in turn may have substituents selected from acyl, alkoxycarbonyl, is alkenoxycarbonyl, aryl and hydroxy, or $R^{16}$ and $R^{17}$ may be joined together to form an alkylene group of from 2 to 5 carbon atoms, thus forming a 3- to 6-membered ring;

such that not more than two of $R^{11}$, $R^{12}$ and $R^{13}$ are H;

$M^1$ is the residue of a zwitterionic monomer zwitterionic monomer of the general formula I $$Y\ B\ X \qquad\qquad I$$

in which Y is an ethylenically unsaturated group selected from $H_2C=CR-CO-A-$, $H_2C=CR-C_6H_4-A^1-$, $H_2C=CR-CH_2A^2$, $R^2O-CO-CR=CR-CO-O$, $RCH=CH-CO-O-$, $RCH=C(COOR^2)CH_2-CO-O$,

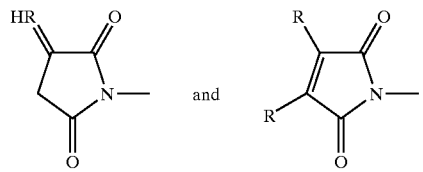

and

A is $-O-$ or $NR^1$;

$A^1$ is selected from a bond, $(CH_2)_nA^2$ and $(CH_2)_n SO_3-$ in which n is 1 to 12;

$A^2$ is selected from a bond $-O-$, $O-CO-$, $CO-O$, $CO-NR^1-$, $-NR^1-CO$, $O-CO-NR^1-$, $NR^1-CO-O-$;

R is hydrogen or $C_{1-4}$ alkyl;

$R^1$ is hydrogen, $C_{1-4}$alkyl or BX;

$R^2$ is hydrogen or $C_{1-4}$ alkyl;

B is a bond, or a straight branched alkanediyl, alkylene oxaalkylene, or alkylene (oligooxalkylene) group, optionally containing one or more fluorine substituents;

X is an ammonium, phosphonium, or sulphonium phosphate or phosphonate ester zwitterionic group;

x is 2 to 500;

$M^2$ is the residue of an ethylenically unsaturated comonomer polymerisable with the zwitterionic monomer; and y is 0 to 500.

In a preferred polymer of this aspect in the general formula VIII $M^1$ preferably has the formula IX

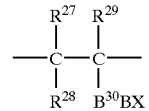

IX in which $R^{27}$ is selected from hydrogen $C_{1-4}$ alkyl and groups CO $OR^2$ in which $R^2$ is hydrogen or $C_{1-4}$ alkyl;

$R^{28}$ is selected from hydrogen and $C_{1-4}$ alkyl;

$R^{29}$ is selected from hydrogen, $C_{1-4}$alkyl and groups CO $OR^2$, provided that $R^{27}$ and $R^{29}$ are not both CO $OR^2$;

$R^{30}$ is selected from a bond, a group $CH_2A^2$ in which $A^2$ is selected from a bond, $-O-$, $-O-CO-$, $-CO-O-$, $-CO-NR^1-$, $-NR^1-CO-$, $-O-CO-NR^1-$ and $-NR^1-CO-O$, a group $-COA-$ in which A is $-O-$ or $NR^1$, in which $R^1$ is hydrogen or $C_{1-4}$ alkyl or BX, and a group $-C_6H_4-A^1-$ in which $A^1$ is $(CH_2)_nA^2$, a bond or $(CH_2)_nSO_3$, or $R^{30}$ and $R^{28}$ or $R^{30}$ and $R^{21}$ may be joined to form a group

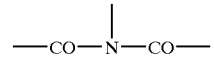

where the N atom is joined to B;

and B and X are as defined above.

In the polymer of the general formula VIII, $M^2$ is preferably the residue of a monomer of the general formula X as described above. The group $M^2$, derived from such a monomer will have the general formula $-C(R^{31})(R^{32}-C(R^{33})R^{34})$, in which $R^{31}$ through $R^{34}$ have the same meanings as in the general formula X.

In the polymer of the general formula X, $R^{11}$, $R^{12}$ and $R^{13}$ as well $X^2$ have the preferred meanings ascribed to the respective groups in the initiator described in relation to the first aspect of the invention above. Thus $X^2$ is preferably halogen, more preferably Cl or Br. Preferably no more than one of $R^{11}$, $R^{12}$ and $R^{13}$ is hydrogen, more preferably none is hydrogen.

In the general formula VIII the residues of $M^2$ are randomly dispersed among the residues of $M^1$.

In the invention, the controlled molecular weight, composition and architectures of these various product polymers bring about desirable levels of control in the properties of the polymers. For instance, the provision of blocks of substantially homopolymer of units derived from zwitterionic monomer are believed to confer desirable wettability and/or lubricity. In AB block copolymers or polymers formed using oligomeric initiators such as based on oligo(alkylene oxides), the provision of long blocks of hydrophobic units are likely to form discrete domains. The domains of highly hydrophilic and highly hydrophobic composition may be useful for controlling polymer properties, such as interactions with other components in a desired system, especially for the absorption and controlled delivery of drugs or other active compounds, and for providing spontaneously self-assembling structures such as coatings, or vesicles or micelles having domains of hydrophilic and domains of hydrophobic nature. These may be useful for controlling absorption and release or solubility of biologically active compounds such as pharmaceuticals. Vesicles may form, with dehydrated or hydrophobic layers or cores and zwitterionic exteriors in aqueous environments. The external zwitterionic layer should confer good biocompatibility, for instance resistance to phagocytosis when administered in vivo. This may be a useful drug delivery device, therefore.

The invention is illustrated further in the accompanying examples, and figures.

FIG. 8 is a $^1$H NMR spectrum of the block copolymer produced in Example 24 at two pH's as described in Example 30;

FIG. 9 shows the $^1$H NMR spectrum and chemical formulae for the initiator, monomer and polymer of Example 31;

Figure 11:
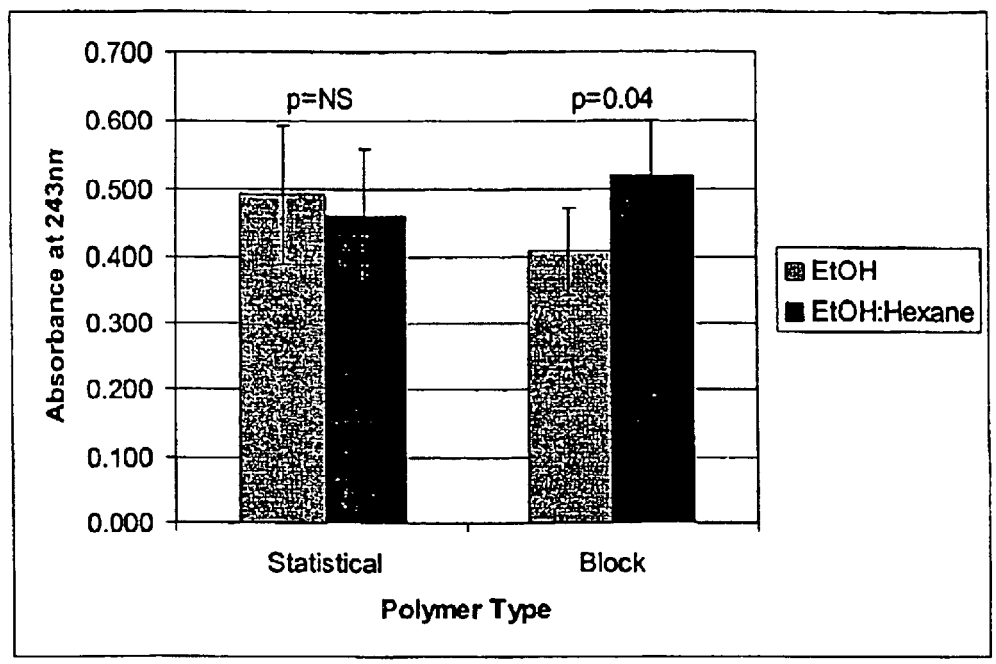

FIG. 11 indicates drug loading levels in Example 58; and

Figure 12:
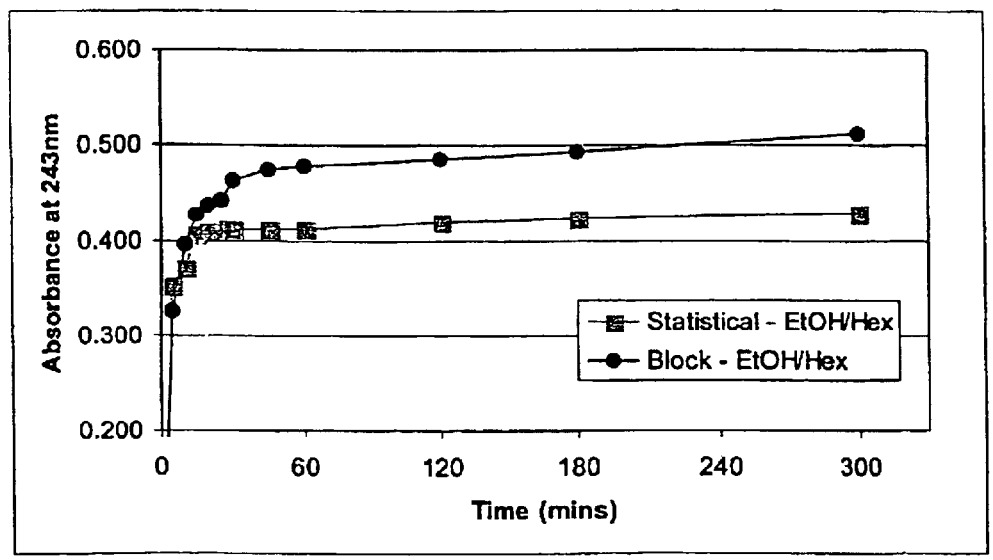

FIG. 12 indicates drug release levels in Example 58.

EXAMPLE 1

Homopolymerisation of MPC (1) via ATRP in Water

Figure 1:
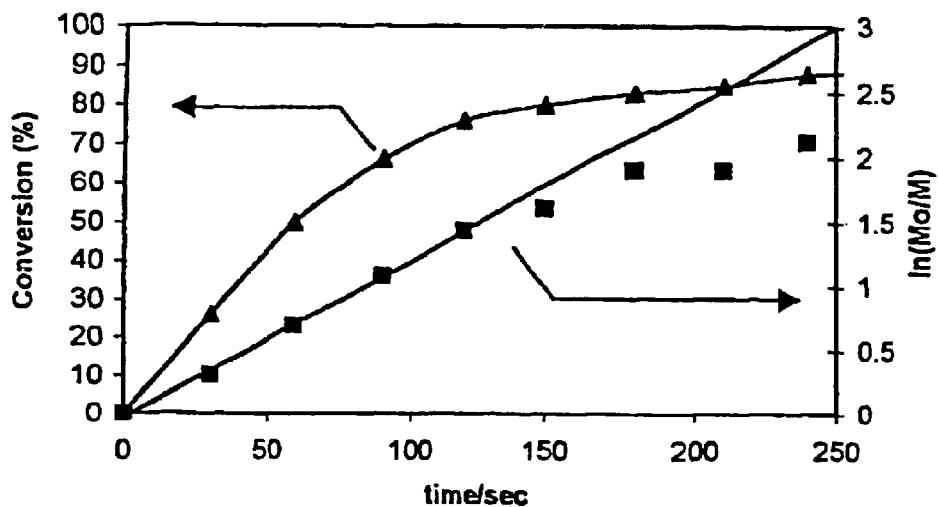
FIGS. 1 and 2 are plots of the reaction kinetics of Example 1.

With reference to FIG. 1, a typical protocol for the controlled polymerisation of 1 by aqueous ATRP is as follows. A water-soluble ATRP initiator (OEGBr, 413 mg, 0.67 mmol, 1 equiv.) was synthesised as reported previously E. J. Ashford, V. Naldi, R. O'Dell, N. C. Billingham and S. P. Armes, *Chem. Commun.*, 1285, 1999 and dissolved in doubly-distilled, de-ionised water (10 ml). After purging with nitrogen for 30 min. Cu(I)Br catalyst (96 mg, 0.67 mmol, 1 equiv.) and bipyridine (bpy) ligand (208 mg, 0.13 mmol, 2 equiv.) were added to the stirred solution under a flow of nitrogen. Monomer 1 (2 g, 6.7 mmol, 10 equiv.) was then added as a solid to the reaction mixture under nitrogen. The reaction mixture immediately became dark green and progressively more viscous. Exotherms of 2–4° C. were typically observed, indicating that polymerisation was occurring. After the reaction was complete the resulting homopolymer 1 was precipitated from THF, then redissolved in water and passed through a silica column to remove residual ATRP catalyst.

Further polymerisations were conducted at different concentrations and ratios of monomer and initiator. In all cases the ATRP of 1 in water was rapid: exotherms of around 3° C. were observed and near-quantitative yields (>96%) were obtained within 10 minutes at 20° C. and 17 wt. % monomer concentration. At higher monomer concentration (40 wt. %) yields of more than 96% were obtained within 3 minutes. However, polydispersities were a little higher at 1.23–1.45, indicating some loss of control under these conditions.

Figure 2:
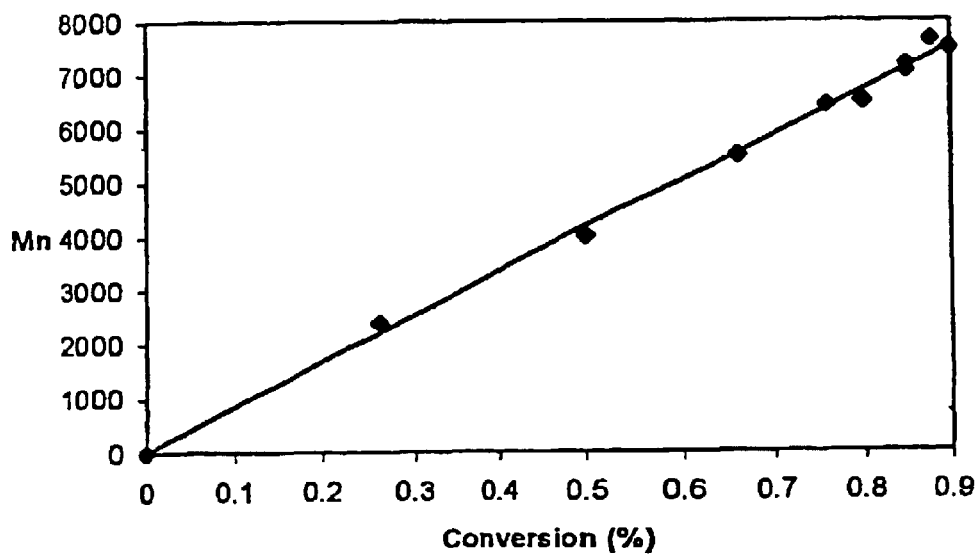

The semi-logarithmic kinetic plot for the homopolymerisation of 1 Conditions: [monomer]=17 wt. %, [initiator]=24 mM; pH 7; the molar ratio of monomer: initiator copper(1): bpy was 28:1:1:2, 20° C.) is linear for the first 50% of the polymerisation (see FIG. 1). At higher conversions non-linear behaviour is observed, indicating that the polymer radical concentration is no longer constant. On the other hand, the evolution of molecular weight with conversion is highly linear up to 95% conversion (see FIG. 2).

Figure 3:
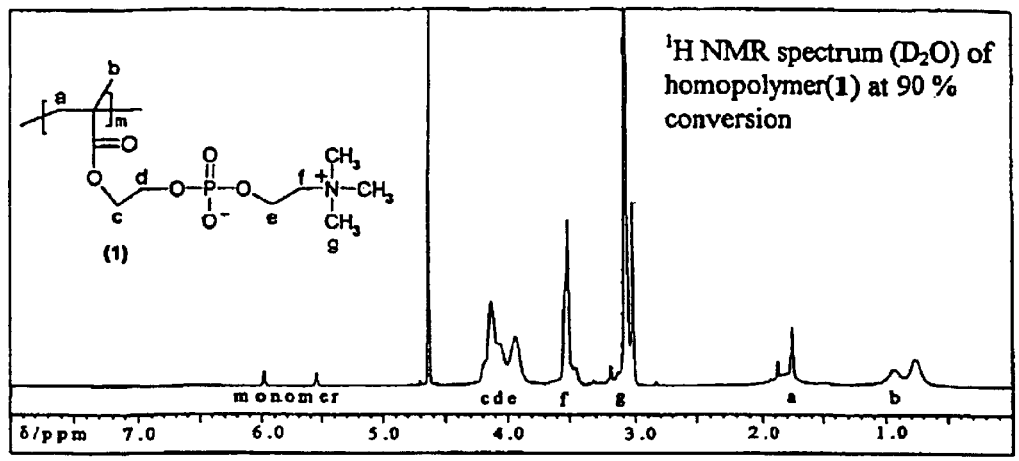
FIG. 3 is the $^1$H NMR spectrum of the polymer produced in Example 1

Molecular weight distributions were assessed using GPC (1.0 M NaCl solution with 50 mM Trisma buffer, Superdex 200 column, PEO standards, RI detector). The kinetics of polymerisation were monitored by $^1$H NMR spectroscopy by comparing the peak integrals due to the monomer vinyl signals (at δ 5.5 and 5.9) to those of the methacrylate backbone (at δ 0.5 to 1.1) (see FIG. 3).

GPC analysis indicates narrow, unimodal molecular weight distributions, with polydispersities (Mw/Mn) of around 1.1 to 1.45 (see Table 1). The initiator was used as an 'end-group' to determine the degrees of polymerisation of the homopolymers by $^1$H NMR spectroscopy (see Table 1). In these calculations it is assumed that the initiator efficiency is 100%, chain transfer is negligible and that every polymer chain contains an oligo(ethylene glycol) fragment. The latter assumption was confirmed by the following experiment. An aqueous solution of poly1 (degree of polymerisation=20) was precipitated into THF, which is a good solvent for the oligo(ethylene glycol)-based initiator. No change in the degree of polymerisation of the precipitated homopolymer was detected by NMR, which confirmed that all of the initiator groups were covalently attached to the polymer chains, as expected. For this example only relatively low degrees of polymerisation were targeted, partly because of the known exclusion limits of our GPC column.

EXAMPLE 2

Homopolymerisation of MPC via ATRP in Methanol

The feasibility of polymerising 1 in methanol at 20° C. was also investigated. Well-controlled ATRP occurred much more slowly under these conditions, with conversions of only 70% after 4 h. Aqueous GPC analysis indicated a final polydispersity of 1.12 at a monomer concentration of 17 wt. %. However, ATRP in aqueous media is preferred since very high yields are achieved much more efficiently (Table 1).

TABLE 1

Summary of synthesis conditions, molecular weight data and conversions for the homopolymerisation of the phosphorylcholine-based monomer (1) via ATRP at 20° C. in either water or methanol.

| Solvent | [Monomer] (wt. %) | [Initiator] (mM) | TheoreticalDp | Experimental Dp[a] | Experimental $M_n$[b] | $M_w/M_n$[b] | Conversion (%) |
|---|---|---|---|---|---|---|---|
| $H_2O$ | 17 | 0 | c | c | c | c | 53[c] |
| $H_2O$ | 17 | 67 | 10 | 11 | 4,710 | 1.18 | >96 |
| $H_2O$ | 17 | 40 | 17 | 18 | 6,900 | 1.28 | >96 |
| $H_2O$ | 40 | 222 | 10 | 10 | 4,230 | 1.23 | >96 |
| $H_2O$ | 40 | 111 | 20 | 20 | 7,550 | 1.39 | >96 |
| $H_2O$ | 40 | 73 | 30 | 29 | 10,720 | 1.45 | >96 |

TABLE 1-continued

Summary of synthesis conditions, molecular weight data and conversions for the homopolymerisation of the phosphorylcholine-based monomer (1) via ATRP at 20° C. in either water or methanol.

| Solvent | [Monomer] (wt. %) | [Initiator] (mM) | TheoreticalDp | Experimental Dp[a] | Experimental $M_n$[b] | $M_w/M_n$[b] | Conversion (%) |
|---|---|---|---|---|---|---|---|
| MeOH | 17 | 67 | 10 | 11 | 3,800 | 1.12 | >96 |
| MeOH | 40 | 73 | 30 | 29 | 8,640 | 1.41 | >96 |

[a]From $^1$H NMR spectroscopy (see text for details).
[b]From aqueous GPC analysis.
[c]This was a spontaneous polymerisation with no initiator, therefore a theoretical Dp could not be calculated.
The conversion stated was measured at 5 h. Aqueous GPC column limits were exceeded, rendering quantitative analysis meaningless.

EXAMPLE 3

Homopolymerization of MPC in $H_2O$ via ATRP Using Methanol as a Co-solvent

A two-neck round-bottom 100 ml flask was charged with OEG-Br, CuCl and bipy. Water (8.0 ml) was added and the mixture was stirred until a homogeneous solution was obtained. Monomer 1 (2.0 g) was dissolved in degassed methanol (2.0 ml), added to the reaction solution and the flask was sealed with a rubber septum. The reaction mixture was maintained under dry nitrogen for the duration of the polymerisation. The molar ratio of [1]:[CuCl]:[bipy]:[initiator] used in this case was 20:1:2:1, i.e. the target Dp was 20.

Figure 4:
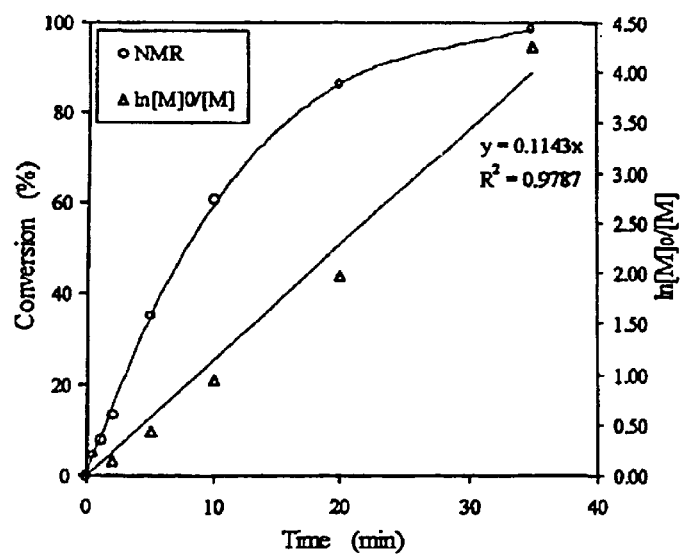
FIGS. 4 and 5 are plots of the reaction kinetics of Example 3.
Figure 5:
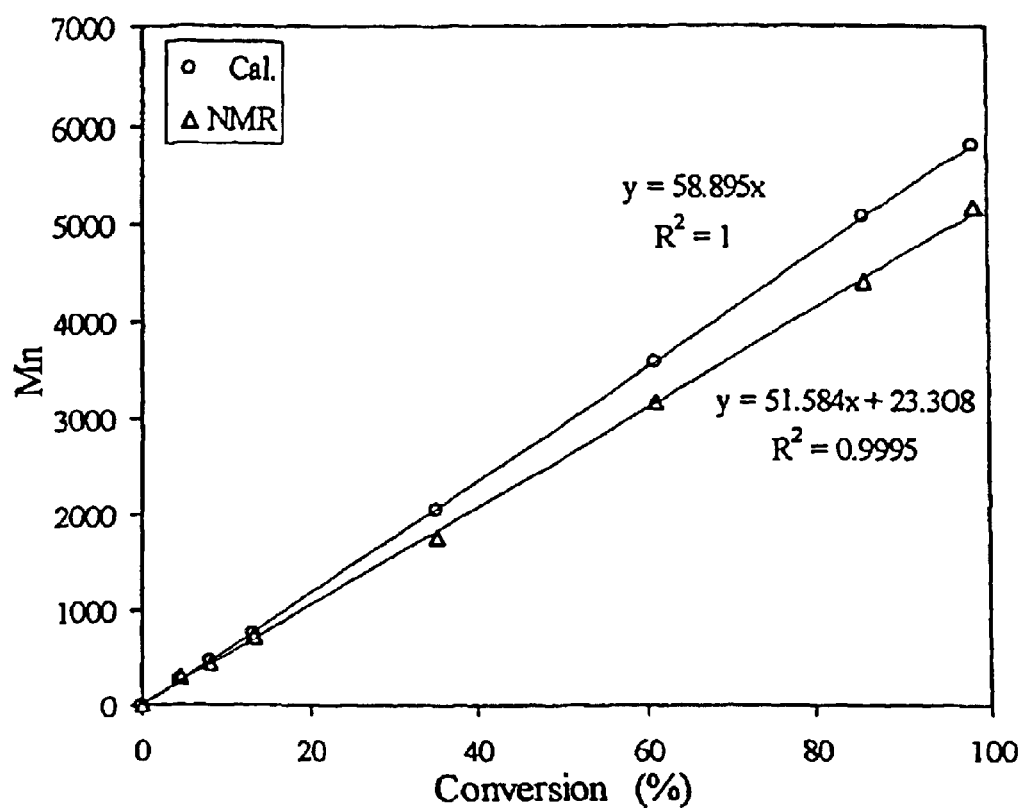

A plot of $\ln([M]_0/[M])$ against time homopolymerisation of HEMA-PC at 20° C. [HEMA-PC]$_0$=0.67 M; [OEG$_{350}$-Br]$_0$=0.033 M; [CuCl]$_0$=0.033 M; [bipy]$_{0=0.066}$M; $H_2O$=8.0 ml, MeOH=2.0 ml was linear and passed through the origin, demonstrating that the radical concentration remained constant on the time-scale of the polymerisation, see FIG. 4. The experimental $M_v$ values obtained from $^1$H NMR agreed well with the theoretical line, see FIG. 5 (same conditions). Polydispersities remained low throughout the polymerisation (Mw/Mn≦1.3) which is indicative of a living polymerisation. In summary, methanol can be used as a co-solvent for 1 which enables this monomer to be conveniently handled as a solution, rather than as a solid. If the methanol content is relatively low (in this case 20 vol %) there appears to be no detrimental effect on the rate of polymerisation.

TABLE 2

Kinetic data for the homopolymerisation of HEMA-PC via ATRP in 20:80 methanol/water mixture at 20° C. The conditions were: [HEMA-PC] = 0.67 M, [OEG-Br] = 0.033 M, [CuCl] = 0.033 M, [bipy] = 0.066 M, $H_2O$ = 8.0 ml, MeOH = 2.0 ml.

| No. | Time (min.) | Conv (%) | Mn (theory) | Mn (NMR) | Mw/Mn |
|---|---|---|---|---|---|
| 1 | 0.5 | 4 | 259 | 291 | 1.14 |
| 2 | 1 | 8 | 466 | 437 | 1.17 |
| 3 | 2 | 13 | 768 | 728 | 1.19 |
| 4 | 5 | 35 | 2060 | 1770 | 1.21 |
| 5 | 10 | 61 | 3590 | 3160 | 1.22 |
| 6 | 20 | 86 | 5070 | 4410 | 1.26 |
| 7 | 35 | 99 | 5810 | 5180 | 1.31 |

EXAMPLE 4

AB-Diblock MPC-NaVBA Copolymer Formation via ATRP

Diblock copolymers based on 1 can also be synthesised via aqueous ATRP. For example, sodium 4-vinylbenzoate (NaVBA) (0.5 g, 3.4 mmol) was homopolymerised ([NaVBA]=13 wt. %, [I]=20 mM, $D_p$=46) to high yield (>90%) in water (3.5 ml) at pH 11 and 20° C. using OEGBr as initiator, as described previously X. S. Wang, R. A. Jackson and S. P. Armes, Macromolecules, 2000, 33, 255.[13] At this point monomer 1 (1.0 g, 3.4 mmol) was added as a solid to this reaction solution ([1]=22 wt. %, [I]=20 mM, theoretical $D_p$=46) to form a diblock copolymer.

Figure 6:
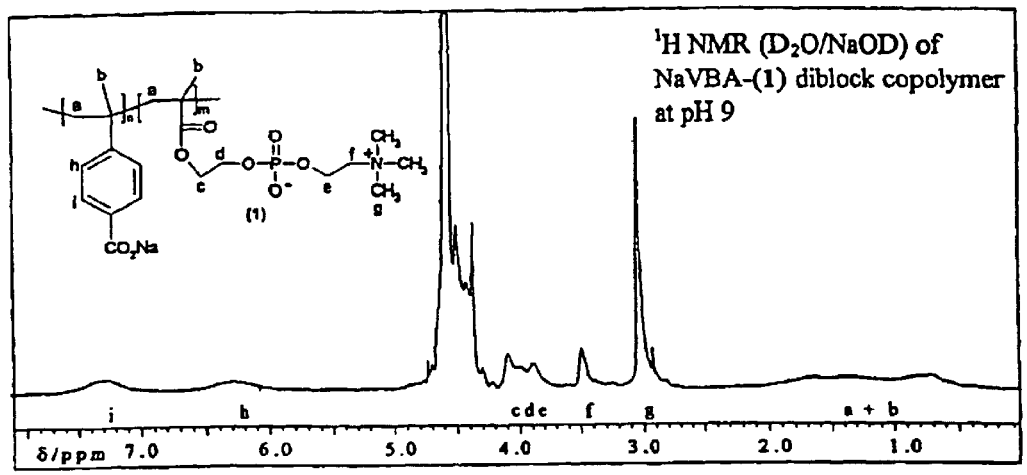
FIGS. 6 and 7 are $^1$H NMR spectra of the block copolymer produced in Example 4 and pH 9 and 3, respectively.
Figure 7:
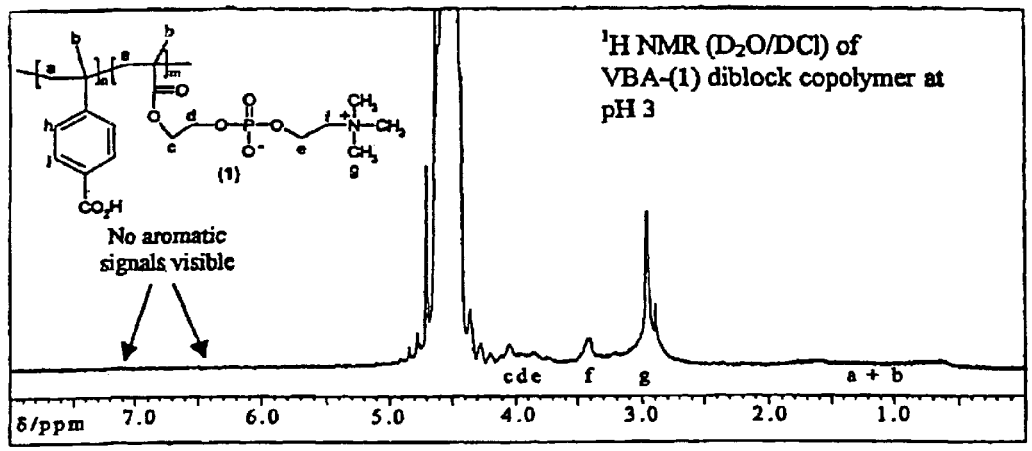

$^1$H NMR studies indicated that the block copolymer comprised approximately 55 mol % NaVBA, theoretical $D_p$(NaVBA)=46, $D_p$(1)=37, see FIG. 6. This block copolymer dissolved molecularly in water at pH 7 but formed micellar aggregates reversibly on addition of acid (pH 3), see FIG. 7. Dynamic light scattering studies indicated a bimodal size distribution, with the larger population having an intensity-average micelle diameter of 190 nm. $^1$H NMR studies of these micelles in $DCl/D_2O$ mixtures confirmed that the 4-vinylbenzoic acid residues formed the dehydrated micelle cores and the phosphorylcholine-based residues formed the micelle coronas, as expected. Such micelles might be expected to act as 'stealth' nanoparticles for in vivo biomedical applications, since the phosphorylcholine outer layer should minimise protein adsorption and hence prevent phagocytosis.

EXAMPLE 5

AB-Diblock MPC-HEMA Copolymer Formation via ATRP 1 (2.0 g, 6.7 mmol) was polymerised in water (10 ml) as described for the homopolymerisation ([1]=17 wt. %, [I]=34 mM, theoretical $D_p$=20), but after 12 min (98% conversion) a degassed solution of HEMA (2-hydroxyethyl methacrylate) (0.88 g, 6.7 mmol) in methanol (5 ml) was added to give a reaction solution composition of 67:33 water:methanol ([HEMA]=6 wt. %, [I]=23 mM, theoretical $D_p$=20). 1 h after the addition of the second monomer the overall conversion for the polymerisation had reached over 98%. The actual degree of polymerisation was 19 for each block ((1), HEMA) as judged by $^1$H NMR spectroscopy.

EXAMPLE 6

AB-Diblock MPC-HEMA Copolymer Formation via ATRP Directly in a H₂O:MeOH Solvent Mixture Block copolymerisation of 1 with HEMA. 1 (4.1 g, $1.35 \times 10^{-2}$ mol) was polymerised first in 10.0 ml of a 50/50 vol/vol methanol/water mixture such that the molar ratios of [1]:[OEG-Br]:[CuCl]:[bipy] were 10:1:1:2. After 150 min, the monomer conversion was 100%, and the homopolymer obtained had a low polydispersity (Mw/Mn=1.19) with an Mn of 3,000. HEMA (3.54 g, $2.7 \times 10^{-2}$ mol, target Dp=20), was then added to the polymerising aqueous solution. After 24 h, a diblock copolymer was obtained with essentially 100% monomer conversion. The copolymer Mn was calculated by end-group analysis using $^1$H NMR. GPC analysis was not possible in this case because the copolymer formed micelles in water.

EXAMPLE 7

AB-Diblock MPC-OEGMA Copolymer Formation via ATRP

Another block copolymer was prepared in a similar fashion to Example 4, first 1 (2.0 g, 6.7 mmol) was polymerized in water (10 ml) as described previously ([1]=17 wt. %, [I]=34 mM, theoretical $D_p$=20) and at 11 min (97% conversion) a degassed solution of OEGMA (oligoethylene glycol methacrylate) (2.87 g, 6.7 mmol) in water (2 ml) was added ([OEGMA]=19 wt. %, [I]=28 mM, theoretical $D_p$=20). 20 min after the addition of the second monomer $^1$H NMR spectroscopy was used to calculate an overall conversion of more than 98% for the diblock copolymer and a degree of polymerisation of 20 for each block. Aqueous GPC analysis gave an $M_n$ of 8,750 and an $M_w/M_n$ of 1.30 for homopolymer (1) and an $M_n$ of 12,900 and an $M_w/M_n$ of 1.34 for the diblock.

monomer conversion was achieved after 60 min, as indicated by $^1$H NMR spectroscopy (no residual vinyl double bonds). After clean-up and isolation, a diblock copolymer (Mn=15,000) was obtained with a relatively low polydispersity (Mw/Mn~1.4).

EXAMPLE 9

AB-Diblock MPC-DMAPS Copolymer Formation via ATRP 1 can also be block copolymerised with DMAPS ([2-(Methacryloyloxy) ethyl]dimethyl (3-sulfopropyl) ammonium hydroxide). 1 (4.0 g, $1.35 \times 10^{-2}$ mol) was homopolymerised first in water (10 ml); [1]:[OEG-Br]:[CuCl]:[bipy]= 20:1:1:2, target Dp=20. After 120 min, the monomer conversion was 100%, and the homopolymer obtained (Mn= 6,200) had a low polydispersity (Mw/Mn=1.20). DMAPS monomer (3.8 g, $1.35 \times 10^{-2}$ mol, target Dp=20) was then added to the polymerising aqueous solution. After 21 h, a block copolymer with an Mn of 12,000 and a polydispersity of 1.27 was obtained.

EXAMPLES 10–15

AB-Diblock Copolymer Formulation with Other Comonomers

MPC was further polymerised using the general technique for AB block copolymers with the conditions indicated in Table 5 and with monomers of varying hydrophobicity. The comonomer type, proportion and intended degree of polymerisation is shown in the table. The extent of conversion after the specified reaction time as well as the measured number average molecular weight (by NMR) are also shown in the table.

TABLE 3

Synthesis of MPC based diblock copolymers via statistical polymerisation
ATRP [MPC] = 0.67 M, [OEG-Br] = 0.067 M,
[CuBr] = 0.067 M, [bipy] = 0.135 M,
MeOH = 10 ml, T = 20° C.

| Example # | Comonomer | MPC in copolymer (mol %) | Target Dp | Time (h) | Conversion (%) | Mn (cal) | Mn (NMR) |
|---|---|---|---|---|---|---|---|
| 10 | HEMA | 10 | 10:90 | 6 | >99 | 15000 | 13000 |
| 11 | nBuMA | 10 | 10:90 | 7 | >99 | 16000 | 15000 |
| 12 | nBuMA | 17 | 10:50 | 5 | >99 | 10000 | 8500 |
| 13 | HPMA | 10 | 10:90 | 23 | >99 | 16000 | 14000 |
| 14 | HPMA | 17 | 10:50 | 21 | >99 | 10000 | 9500 |
| 15 | DHPMA | 33 | 10:20 | 72 | >99 | 6200 | 6000 | nBuMA = n-Butyl methacrylate
HPMA = Hydroxypropyl methacrylate
DHPMA = Dihydroxypropyl methacrylate

EXAMPLE 8

AB-Diblock OEGMA-MPC Copolymer Formation via ATRP

OEGMA (5.03 g, $1.2 \times 10^{-2}$ mol) was polymerised first in water (10 ml) under the following conditions: [OEGMA]: [OEG-Br]:[CuCl]:[bipy]=20:1:1:2; target Dp=20. After 20 min, the monomer conversion reached 100% with Mn=8, 600 and Mw/Mn=1.19, as judged by aqueous GPC. 1 was then added as a solid (3.56 g, $1.2 \times 10^{-2}$ mol; target Dp=20) to the polymerising OEGMA solution. Essentially 100%

EXAMPLES 16 TO 18

Further AB Block Synthesis in Water/Methanol Mixtures

Further examples of AB block copolymerisation of MPC as block A were conducted using the ATRP method and under the general conditions indicated in the heading to Table 4. The comonomers for the second block and th relative levels, as well the solvent type the reaction times, the product and intermediate homopolymer characteristic and some of the polydispersities are also shown in Table 4.

TABLE 4

Synthesis of MPC based diblock copolymers via ATRP
[MPC] = 0.67 M, [OEG-Br]:[CuCl]:[bipy] = 1:1:2, T = 20° C.;
MPC polymerised first in all cases

| comonomer | MPC in copolymer (mol %) | Target Dp | Solvent | Time for 100% Conversion MPC homopolymer (mins) | Diblock copolymer (h) | Mn(AGPC) MPC homopolymer | Mn(AGPC) Diblock copolymer | Mw/Mn MPC homopolymer | Mw/Mn Diblock copolymer |
|---|---|---|---|---|---|---|---|---|---|
| DHPMA (Ex 16) | 33 | 10:20 | MeOH:H$_2$O (50:50) | 105 | 24 | 2900 | — | 1.18 | 1.43 |
| HEMA (Ex 17) | 33 | 10:20 | MeOH:H$_2$O (50:50) | 150 | 24 | 3000 | — | 1.19 | — |
| DMAEMA (Ex 18) | 50 | 20:20 | H$_2$O | 100 | 20 | 5900 | 9000 | 1.20 | 1.42 |

DMAEMA = Dimethylaminoethyl methacrylate

EXAMPLE 19

ABC Triblock Copolymer of MPC and HEMA

A triblock copolymer was synthesised with MPC forming the first (A) and third (C) homopolymer blocks, using OEGBr as the initiator in a 50:50 water:methanol solvent. MPC was used in an amount to give a target Dp for each block of 10. The monomer used to make homopolymer block B was 2-hydroxy ethylmethacrylate which was used in an amount to give a target Dp of 20. It was found that about 100% conversion for the first block occurred in 1.5 hours, for the second in about 2.5 hours and for the third in about 18.5 hours. The calculated Mn for A, AB and ABC were respectively, 3000, 5600 and 8500, whilst the measured Mn values (by NMR) were 2900, 5500 and 8420.

EXAMPLES 20 AND 21

Oligomeric Difunctional Initiator

A difunctional inhibitor, a polypropylene oxide having two terminal is bromine substituents (MW about 2000), was used to form two polymers, each by carrying out a single step ATRP process with a single monomer, that is MPC (1), and using methanol as the solvent. The process was conducted using 0.67M 1, 0.067 M CuCl transition metal compound, 0.135 M bipyridine and sufficient initiator to provide a polymer with a degree of polymerisation of each block of MPC polymer of 10, for example 20, and a degree of polymerisation of 20 for examples 21. The calculated Mn for the two examples were 7940 and 13900, respectively. The time for about 100% conversions were, respectively 1.5 and 2 hours, whilst the measured values of Mn were 7520 and 11600, respectively.

EXAMPLES 22–29

Table 6 describes the conditions and results for the synthesis of a variety of MPC-DMAEMA and MPC-DEAEMA diblock copolymers by methanolic ATRP. The reaction conditions were [MPC]=2.02M (6.0 g in 10 ml methanol), [MPC]:[OEG-Br]:[CuBr]:[bipy]=30:1:1:2, T=20° C.; MPC was polymerised first in all cases followed by neat DMAEMA (or DEAEMA). Almost complete monomer conversion was achieved after the time indicated in Table 6 for the diblock, as indicated by $^1$H NMR spectroscopy (no residual vinyl double bonds). The reaction mixture was diluted with methanol and passed through a silica column to remove residual ATRP catalyst. After solvent evaporation, the products were dried under vacuum at room temperature.

TABLE 6

Data of the polymerization of MPC - DMAEMA or DEAEMA diblock copolymers in methanol

| Ex # | Comonomer | MPC in copolymer (mol %) | TargetDp | [Amine] (M) | Time for >99% Conversion MPC HOMO (mins) | Time for >99% Conversion MPC Diblock (h) | Mn(AGPC) MPC(a) HOMO | Mn(AGPC) MPC(b) Diblock | Mw/Mn MPC HOMO | Mw/Mn MPC Diblock |
|---|---|---|---|---|---|---|---|---|---|---|
| 22 | DEA | 50 | 20:20 | 1.35 | 180 | 20 | 6200 | 14000 | 1.15 | 1.22 |
| 23 | DEA | 33 | 10:20 | 1.35 | 180 | 21 | 3500 | 11000 | 1.17 | 1.29 |
| 24 | DEA | 50 | 30:30 | 2.02 | 130 | 20 | 10000 | 21000 | 1.18 | 1.30 |
| 25 | DEA | 33 | 30:60 | 4.04 | 130 | 22 | 11000 | 31000 | 1.19 | 1.29 |
| 26 | DEA | 23 | 30:100 | 6.73 | 130 | 23 | 11000 | 43000 | 1.19 | 1.28 |
| 27 | DMA | 50 | 30:30 | 2.02 | 120 | 20 | 11000 | 22000 | 1.16 | 1.27 |
| 28 | DMA | 33 | 30:60 | 4.04 | 120 | 24 | 10000 | 34000 | 1.15 | 1.29 |
| 29 | DMA | 23 | 30:100 | 6.73 | 120 | 48 | 11000 | 46000 | 1.18 | 1.32 |

DMA = dimethylaminoethylmethacrylate
DEA = diethylaminoethylmethacrylate
AGPC = aqueous gel permeation chromatography

EXAMPLE 30

Reversible pH-Induced Micellisation for Polymer Example 24

Micelles with DEAEMA cores were obtained by careful adjustment of the solution pH. The MPC-DEAEMA diblock copolymers dissolved in dilute DCI or NaOD at 20° C. to produce a 1.0 w/v % copolymer solution with a final pH of 1.37 and 8.68 respectively. FIG. 8 shows the proton NMR spectra obtained for the MPC-DEAEMA diblock copolymer at pH 1.37 and 8.68 respectively.

Careful addition of dilute DCI to the MPC-DEAEMA diblock copolymer solution produced a final pH of 1.37. Thus this copolymer dissolved molecularly in dilute aqueous solution at pH 1.37 and 20° C., since both the MPC and DEAEMA blocks are hydrophilic under these conditions. It can be characterised by proton NMR spectra in FIG. 8$a$, in where the resonance at $\delta$ 1.25 and $\delta$ 3.4 ppm that was assigned to the residual protons of DEA are presented.

Comparing FIG. 8, it is clear that the signals due to the DEAEMA residues at $\delta$ 1.25 and $\delta$ 3.4 ppm have almost disappeared, indicating much lower mobility and decreased solvation for this block. On the other hand, the signals due to the MPC block at $\delta$ 4.0 and $\delta$ 3.5 ppm are still prominent, indicating that this block forms the solvated micellar corona. Micelles comprising DEAEMA cores and MPC corona were formed as expected at pH 8.68 or higher.

Self-assembly was completely reversible: addition of acid resulted in instantaneous micellar dissolution.

EXAMPLE 31

MPC-Based Macromomer by (aq) ATRP Using a Functional Initiator

A two-neck round-bottom 100 ml flask was charged with vinyl functional initiator 1 (shown in FIG. 9), Cu(I)Br and bipy. Water (10.0 ml) was added and the mixture was stirred until a homogeneous solution was obtained. MPC monomer (2.0 g) was added to the reaction solution and the flask was sealed with a rubber septum. The reaction mixture was maintained under dry nitrogen and at 20° C. for the duration of the polymerisation. The molar ratio of [MPC]:[initiator]:[CuBr]:[bipy] used in this case was 10:1:1:2, i.e. the target Dp was 10.

TABLE 7 indicates the Mn and Mw values established for the reaction mixture after various reaction periods and at completion of polymerisation

| No | Time (min.) | Conv. (%) | Mn (theory) | Mn (NMR) | Mw/Mn |
|----|-------------|-----------|-------------|----------|-------|
| 1  | 1           | 25        | 770         | 730      | 1.22  |
| 2  | 2           | 33        | 1000        | 960      | 1.23  |
| 3  | 5           | 39        | 1200        | 1100     | 1.23  |
| 4  | 10          | 54        | 1700        | 1600     | 1.24  |
| 5  | 30          | 81        | 2500        | 2100     | 1.25  |
| 6  | 60          | 86        | 2900        | 2400     | 1.26  |
| 7  | 120         | 99        | 3100        | 2500     | 1.27  |

Figure 10:
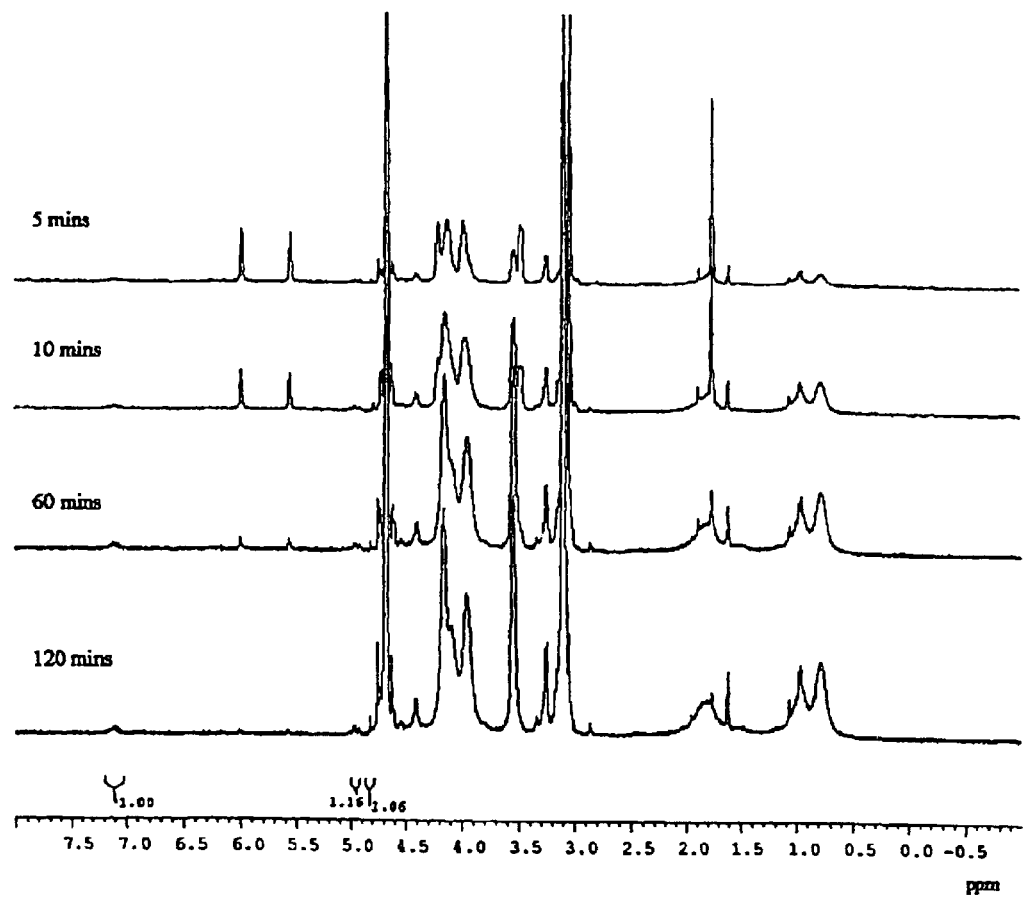
FIG. 10 shows the $^1$H NMR during the polymerisation process of Example 31.

FIG. 9 shows the $^1$H NMR spectra of the initiator, monomer used in the project and the polymer obtained here. As can be seen from FIG. 10 which shows the $^1$Hnmr spectra during polymerisation, the area of the polymer peak at $\delta$1 ppm increased gradually with time while the peak area due to the monomer vinyl signals at $\delta$5.5–6.0 ppm decreased with time. The initiator's vinyl acetate peaks at $\delta$5 and $\delta$4.75 ppm due to CH$_2$= and the peaks at $\delta$7.1 ppm correspond to =CH—O— remained through the polymerization process.

The aqueous GPC traces of the final polymer and intermediate polymer obtained indicate the peaks corresponding to the polyMPC and the peaks from residual MPC monomer. The monomer peak disappeared when monomer conversion reached over 99 percent, suggestion the complete conversion of the monomer.

EXAMPLE 32

Polymerisation of a Statistical Quatro-Polymer via ATRP

An experimental procedure similar to that for Example 27 was adopted, except that for the statistical quatro-polymer MPC$_{0.30}$nBuMA$_{0.50}$HPMA$_{0.15}$TMSPMA$_{0.05}$ all of the monomers were added together at the beginning of the polymerization. TMSPMA is trimethoxysilylpropyl-methacrylate. The concentration of MPC was 2.02M and the ratios are given in moles. The concentration of OEG-Br was 6.73×10$^{-2}$ and [OEG-Br]:[CuBr]:[bipy] is 1:1:2. Target Dp is 100. NMR after completion of polymerisation indicated no residual comonomers (absence of vinyl signals between $\delta$5.0–6.5 ppm). No GPC analysis was possible with this copolymer due to the presence of the reactive silyl groups.

EXAMPLE 33

AB-Diblock MPC-DMAME Copolymer Formation via ATRP

MPC was block copolymerised with the methyl chloride quaternised derivative of DMA (DMAME). MPC (6.0 g, 2.02×10$^{-2}$ mol) was homopolymerised first in a solvent mixture (2 ml methanol+8 ml water); [MPC]:[OEG-Br]:[CuBr]:[bipy]=30:1:1:2, target Dp=30. After 60 mins, the monomer conversion reached>99%, and the MPC homopolymer obtained had a low polydispersity (Mw/Mn<1.20). DMAME monomer (4.16 g, 2.02×10$^{-2}$ mol, target Dp=30) was then added to the polymerising solution. After 46 h, a block copolymer with a monomer conversion of more than 99% was obtained, as indicated by $^1$H NMR spectroscopy (no residual vinyl double bonds at $\delta$ 5.5–6.0 ppm.

EXAMPLE 34

AB-Diblock MPC-DMABZ Copolymer Formation via ATRP

Another block copolymer was prepared in a similar fashion to Example 33, first MPC (6.0 g, 2.02×10$^{-2}$ mol) was homopolymerised in 10.00 ml of a 20/80 vol/vol methanol/water mixture such that the molar ratios of [MPC]:[OEG-Br]:[CuBr]:[bipy] were 30:1:1:2 with a target Dp=30, at 60 mins (99% monomer conversion) a degassed benzyl chloride derivative of DMA [DMABZ] monomer (5.71 g, 2.02×10$^{-2}$ mol, target Dp=30) was then added to the polymerising aqueous solution. 50 hours after the addition of the second monomer, $^1$H NMR spectroscopy was used to determine an overall conversion of more than 96% for the diblock copolymer.

EXAMPLE 35

AB-Diblock PSSNa-MPC Copolymer Formation via ATRP

Sodium 4-styrenesulfonate (SSNa) was typically polymerised first, as follows: The SSNa monomer (4.17 g) was dissolved in a mixed solvent (15 ml H₂O+5 ml MeOH), the pH was adjusted to about 10–12 with NaOH and the solution was degassed. The sodium 4-(bromomethyl)benzoate initiator (NaBMB) was added, together with the bipy ligand and Cu(I)Cl such that the [SSNa]:[NaBMB]:[CuCl]:[bipy] molar ratio was 50:1:1:2 and the target Dp was 50. After 120 mins, the SSNa monomer conversion reached 95% and the second monomer, MPC, was then added as a solid (6.0 g, $2.02 \times 10^{-2}$ mol; target Dp=50) to the polymerising SSNa solution. More than 99% MPC conversion was achieved after 22 h, as indicated by $^1H$ NMR spectroscopy (no residual vinyl double bonds at δ 5.5–6.0 ppm).

EXAMPLES 36–37

AB-Diblock MPC-PPO Copolymer Formation via ATRP

Block copolymerisation of MPC was achieved using a poly(propylene glycol) [PPO] macro-initiator: MPC (6.0 g, $2.02 \times 10^{-2}$ mol) was polymerised in 10.0 ml methanol. The molar ratios of [MPC]:[PPO-Br]:[CuBr]:[bipy] were 30:1:1:2. After 12 h, the MPC conversion reached 100%, as indicated by $^1H$ NMR spectroscopy (no residual vinyl double bonds at δ 5.5–6.0 ppm).

Another MPC-PPO block copolymer was also synthesised with a longer MPC block under the following conditions: MPC (6.24 g, $2.10 \times 10^{-2}$ mol); [MPC]:[PPO-Br]: [CuCl]:[bipy]=50:1:1:2.5. A diblock copolymer with a monomer conversion of 100% was obtained after 18 h.

EXAMPLES 38–43

MPC-Based Copolymers Formation via ATRP

Table 8 summarises the conditions and results from MPC diblock copolymer syntheses. The fraction conditions were [MPC]=2.02 M, [OEG-Br]:[CuBr]:[bipy]=1:1:2, T=20° C.; MPC was polymerised first in all cases. The second block was formed either of diethylaminoethyl methacrylate (DEA) or ammonium-2-sulphatoethylmethacrylate (SEM).

TABLE 8

Data for the MPC-based copolymers

| Ex # | Target Composition | Solvent composition | [Second Monomer] (mol dm⁻³) | Time for >99% Conversion | |
|---|---|---|---|---|---|
| | | | | MPC Homo (mins) | MPC Diblock (h) |
| 38 | MPC₅₀ - DEA₅₀ | MeOH | 2.02 | 100 | 24 |
| 39 | MPC₅₀ - DEA₁₀₀ | MeOH | 4.04 | 100 | 46 |
| 40 | MPC₃₀ - DEA₄₀ | MeOH | 2.69 | 70 | 19 |
| 41 | MPC₃₀ - DEA₅₀ | MeOH | 3.37 | 70 | 43 |
| 42 | MPC₃₀ - DEA₇₀ | MeOH | 4.71 | 70 | 46 |
| 43 | MPC₅₀ - SEM₅₀ | H₂O | 2.02 | 40 | 24 |

EXAMPLES 44–47

Homopolymerisation of MPC in MeOH via ATRP Using New Functional Initiators and a PPO-based Macro-initiator Table 9 describes the conditions and results from MPC homopolymer sytheses. The reaction conditions were [MPC]=$2.02 \times 10^{-2}$ mol (examples 44, 46, 47), [MPC]= $1.35 \times 10^{-2}$ mol (example 45), [OEG-Br]:[CuBr]:[bipy]= 1:1:2, T=20° C.

TABLE 9

Data for the MPC homopolymers

| Ex # | Target Composition | Solvent composition | [Initiator] (mol dm⁻³) | Time for >99% Conversion (h) |
|---|---|---|---|---|
| 44 | PEG₄₅ - MPC₄₀ | MeOH | 5.05 | 24 |
| 45 | PEG₄₅ - MPC₁₀ | MeOH | 1.35 | 3 |
| 46 | DMAEBr - MPC₂₀ | MeOH | 0.10 | 3 |
| 47 | MEBr - MPC₅₀ | MeOH | 0.04 | 3 |

DMAEBr: This is a functional initiator for macromonomer syntheses. It was synthesised as follows:

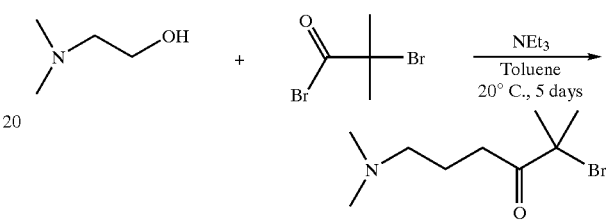

MEBr: An NMR-labelled initiator. It was synthesised according to:

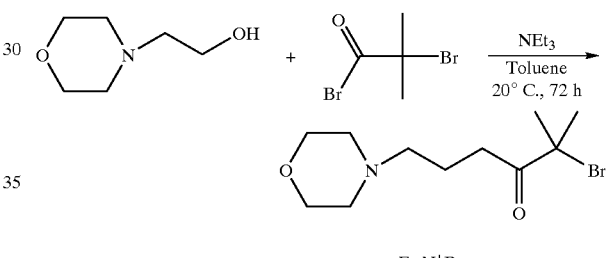

EXAMPLE 48

MPC-Based Macromonomer via ATRP

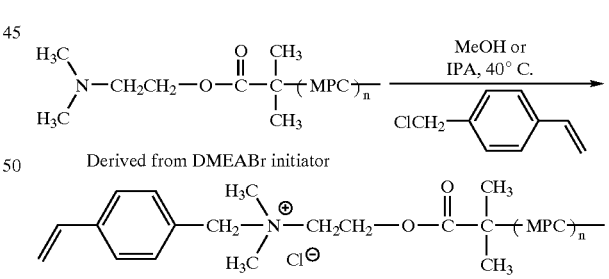

The MPC polymer obtained in Example 46 was reacted with 4-vinylbenzyl chloride [4-VBZCl] in methanol at 40° C. The vinyl benzylchloride quaterises the tertiary amine group at the terminal of the MPC polymer. The molar ratios of [MPC polymer]:[4-VBZCl] were 1:2. A macromonomer was obtained after five days. This macromonomer was contaminated with residual 4-VBZCl, as indicated by $^1H$ NMR spectroscopy. The peaks at δ 5.5–6.0 ppm and δ 6.5–7.0 ppm are due to the vinyl and aromatic groups of the 4-VBZCl, respectively. Therefore the resulting macromonomer required further purification by washing with THF.

EXAMPLES 49–50

A(BC)-Diblock MPC-MMA/DEA) Copolymer Formation via ATRP

MPC was block copolymerised with MMA/DEA. MPC (6.0 g, $2.02\times10^{-2}$ mol) was homopolymerised first in 10 ml methanol; [MPC]:[OEG-Br]:[CuBr]:[bipy]=30:1:1:2, target Dp=30. After 60 mins, the monomer conversion reached >99%, and the homopolymer obtained had a low polydispersity (Mw/Mn<1.20). MMA monomer (1.35 g, $1.35\times10^{-2}$ mol, target. Dp=20) and DEA monomer (5.0 g, $2.70\times10^{-2}$ mol, target Dp=40) was then added to the polymerising solution. After 24 h, a block copolymer with a monomer conversion of more than 99% was obtained; The reaction mixture was diluted with methanol and passed through a silica column to remove residual ATRP catalyst. After solvent evaporation, the products were dried under vacuum at room temperature. For example 50, the MMA/DEA ratio was changed to 40/20.

EXAMPLE 51

AB-Diblock MPC-HEMA Copolymer Formation via ATRP

Another block copolymer was prepared in a similar fashion to Example 49, first MPC (6.0 g, $2.02\times10^{-2}$ mol) was homopolymerised in 10.00 ml of the methanol such that the molar ratios of [MPC]:[OEG-Br]:[CuBr]:[bipy] were 50:1:1:2 with target Dp=50. After 100 mins (99% monomer conversion) a degassed HEMA monomer (2.1 g, $1.62\times10^{-2}$ mol, target Dp=40) was then added to the polymerising aqueous solution. 20 hours after the addition of the second monomer, $^1$H NMR spectroscopy was used to determine an overall conversion of more than 99% for the diblock copolymer. A white diblock copolymer (Mn=16,000) was obtained with a relatively low polydispersity (Mw/Mn~1.25).

EXAMPLE 52

AB-Diblock MPC-CBMA Copolymer Formation via ATRP

MPC (6.0 g, $2.02\times10^{-2}$ mol) was polymerised first in methanol (10 ml) under the following conditions: [MPC]:[OEG-Br]:[CuBr]:[bipy]=100:1:1:2; target Dp=100. After 120 mins, the monomer conversion reached almost 100% with Mn=31,000 and Mw/Mn=1.16, as judged by aqueous GPC. The second monomer, N-methacryloyloxyethyl-N, Ndimethylammoniummethyl carboxylate inner salt CBMA (carboxybetaine methacrylate) was then added (4.82 g, $2.02\times10^{-2}$ mol; target Dp=100) to the polymerizing MPC solution. Almost complete monomer conversion was achieved after 24 hours, as indicated by $^1$H NMR spectroscopy (no residual vinyl double bonds). A white diblock copolymer (Mn=33,000) was obtained with a relatively low polydispersity (Mw/Mn~1.20).

EXAMPLE 53

AB-Diblock MPC-MMA Copolymer Formation via ATRP

Block copolymerisation of MPC with MMA. MPC (6.0 g, $2.02\times10^{-2}$ mol, target Dp=100) was polymerised in 10.0 ml methanol. The molar ratios of [MPC]:[OEG-Br]:[CuBr]:[bipy] were 100:1:1:2. After 3 hours, the monomer conversion reached more than 99%, as indicated by $^1$H NMR spectroscopy (no residual vinyl double bonds at δ 5.5–6.0 ppm). MMA monomer (0.6 g, $6.06\times10^{-3}$ mol, target Dp=30) was then added to the polymerising solution. After 24 h, a block copolymer with a monomer conversion of more than 99% is was obtained. The reaction mixture was diluted with methanol and passed through a silica column to remove residual ATRP catalyst. After solvent evaporation, the products were dried under vacuum at room temperature.

EXAMPLES 54 AND 55

MPC-DMA-DEA ABC Triblock Copolymers Formation via ATRP

MPC (6.0 g, $2.02\times10^{-2}$ mol) was polymerised first in methanol (10 ml) under the following conditions: [MPC]:[OEG-Br]:[CuBr]:[bipy]=30:1:1:2; target Dp=30. After 60 min, the monomer conversion reached 99% with Mn=10,000 and Mw/Mn=1.19, as judged by aqueous GPC. The second monomer, DMA was then added as a liquid (2.15 g, $1.35\times10^{-2}$ mol; target Dp=20) to the polymerising solution. Essentially 98% monomer conversion was achieved after 150 min, as indicated by $^1$H NMR spectroscopy. DEA was then added as the third monomer (5.05 g, $2.70\times10^{-2}$ mol, target Dp=40) to the polymerising solution. After 48 h, a block copolymer with an Mn of 20,000 and a polydispersity of 1.43 was obtained.

A MPC 30-DMA20-DEA.30 triblock copolymer was polymerised using the same procedure with an appropriate adjustment to the level of DEA.

EXAMPLE 56

Polymerisation of an MPC-Vinylacetate Functional Macromonomer (Example 31)

The MPC-based macromer (0.5 g) described in example 31 was dissolved in methanol (10 g) containing 0.5 wt % Perkadox 16 initiator. The solution was stirred at reflux for 4 hours after which the reaction mixture was allowed to cool. The solution was sampled and the solvent removed to yield a white solid. This was redissolved in $D_2O$ and subjected to $^1$H NMR and compared to the spectrum of the macromer. The polymerised product showed no vinyl bonds at 5.5 and 6.0 ppm, demonstrating that the vinyl acetate reactive chain end group can be polymerised to produce a comb-like poly-MPC polymer.

EXAMPLE 57

Shell-crosslinking of MPC30-DMA20-DEA30

The a MPC30-DMA20-DEA30 triblock copolymer formed in Example 55 was micellised as in Example 30. The intensity-average micelle diameter was found to be 56 nm as a 1 wt. % aqueous solution at pH 9.6 (polydispersity 0.064—which is good).

This was shell-crosslinked in solution by addition of 1,2-bis(2-iodoethoxy)ethane (BIEE) at pH 8–9 for 3 days at 20° C. with a BIEE:DMA ratio 0.5 mol ratio (target crosslinking); this reacts to quaternise and cross-link the DMA residues. After shell-crosslinking of this triblock-copolymer, the micelles are 63 nm diameter (polydispersity 0.08) at pH 9.6 and 67 nm (polydispersity 0.111) at pH 2.0. The latter measurement is a proof that the shell cross-linking was successful, since non-crosslinked micelles dissociate in acidic media.

EXAMPLE 58

Polymerisation of (MPC30-HPMA15-TMSPMA5)-(BMA50) Block Quatro Polymer

The polymer of (MPC30-HPMA1 5-TMSPMA5)-(BMA50) was made according to the process outlined in example 32, except the MPC, HPMA and TMSPMA were added together and polymerised statistically to 99% conversion before final addition of the BMA to form a separate block of hydrophobe in the copolymer.

EXAMPLE 59

Drug Delivery Studies

Steel coupons coated with example 32 (statistical quatro polymer) and example 58 (block quatro polymer) and cured overnight at 70° C. The coupons were then immersed in a 10 mg/ml solution of dexamethasone in either ethanol or ethanol:hexane (3:1) for 30 minutes. The coupons were removed and allowed to air dry for a further 30 minutes before being eluted into 5 ml of ethanol using sonication. The ethanol solution was then analysed by UV spectroscopy at 243 nm to detect the dexamethasone eluant. FIG. 11 shows the relative amounts of drug loaded from the two solutions using the two polymers. Loading from ethanol or ethanol:hexane had no statistically significant difference on the total loading of drug in the statistical is quatro polymer (example 32). The was, however, as statistically significant increase (p=0.04) for the block quatro polymer, indicating that the hexane co-solvent was able to access and swell the hydrophobic blocks and increase the drug loading relative to the ethanol-swollen sample.

Similarly, when the same polymers were loaded from the mixed ethanol:hexane solution and eluted in a kinetic experiment over 300 minutes, a higher final absorbance was recorded for the block quatro polymer, indicating more effective loading into the polymer coating by the solvent combination than for the statistical quatro-polymer coating (FIG. 12).

EXAMPLE 60

Performance Data

Some of the polymers made above were subjected to tests to determine whether they reduce the level of fibrinogen absorption. This is an indicator of haemocompatibility.

Fibrinogen ELISA was performed as previously described in WO-A-9301221. All polymers as indicated in Table 10 were dip-coated onto polyethylene terephthalate (PET) strips (30 mm×10 mm) at 3 mm/sec from ethanolic solutions (10 mg/ml). The cross-linkable polymer (Example 32) was crosslinked at 70° C. overnight prior to testing. The positive control coating was an MPC-laurylmethacrylate (1:2) copolymer made by conventional free radical polymerisation and described in WO-A-9301221 and used commercially as a biocompatible and haemocompatible coating which reduces the fibrinogen absorption.

TABLE 10

| Example | Coating | Mean Abs @ 450 | S.D. | % CV | % Reduction | t-Test |
|---------|---------|----------------|------|------|-------------|--------|
| 60.1.1 | No coating | 0.797 | 0.053 | 6.6 | — | — |
| 60.1.2 | Control | 0.136 | 0.012 | 8.9 | 83 | 0.000 |
| 60.1.3 | Polymer 25 | 0.116 | 0.015 | 11.6 | 85.5 | 0.000 |

TABLE 10-continued

| Example | Coating | Mean Abs @ 450 | S.D. | % CV | % Reduction | t-Test |
|---------|---------|----------------|------|------|-------------|--------|
| 60.1.4 | Polymer 26 | 0.189 | 0.03 | 13.4 | 76.3 | 0.000 |
| 60.2.1 | No coating | 0.909 | 0.117 | 12.9 | — | — |
| 60.2.2 | Control | 0.175 | 0.021 | 12 | 80.8 | 0.000 |
| 60.2.3 | Polymer 32 | 0.19 | 0.028 | 14.8 | 79.1 | 0.000 |

These data indicate that the simple block copolymers of examples 25 and 26 can be molecularly dissolved in an alcohol and physi-adsorbed onto planar surfaces to form stable biocompatible coatings. The statistical quatro polymer of example 32 can be coated and cured to form a stable biocompatible coating.

What is claimed is:

1. A polymerisation process in which ethylenically unsaturated monomers including a zwitterionic monomer of the general formula I $$Y\ B\ X \qquad \qquad I$$

in which Y as an ethylenically unsaturated group selected from the group consisting of $H_2C=CR-CO-A-$, $H_2C=CR-C_6H_4-A^1-$, $H_2C=CR-CH_2A^2$, $R^2O-CO-CR=CR-CO-O$, $RCH=CH-CO-O-$, $RCH=C(COOR^2)CH_2-CO-O$,

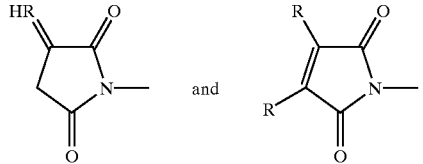 and 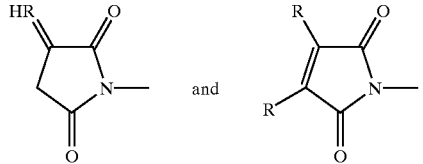

A is $-O-$ or $NR^1$;

$A^1$ is selected from the group consisting of a bond, $(CH_2)_nA^2$ and $(CH_2)_nSO_3-$ a which n is 1 to 12;

$A^2$ is selected from the group consisting of a bond, $-O-$, $O-CO-$, $CO-O$, $CO-NR^1-CO$, $O-CO-NR^1-$, and $NR^1-CO-O-$;

R is hydrogen or $C_{1-4}$ alkyl;

$R^1$ is hydrogen, $C_{1-4}$ alkyl or BX;

$R^2$ is hydrogen or $C_{1-4}$ alkyl;

B is selected from the group consisting of a bond, and straight and branched alkanediyl, alkylene oxaalkylene, and alkylene (oligooxalkylehe) groups, optionally containing one or more fluorine substituents;

X is ammonium phosphonium, or sulphonium phosphate or phosphonate ester zwitterionic group;

are polymerised by a living radical polymerisation process in the presence of an initiator, and a catalyst.

2. A polymerisation process according to claim 1 in which X is a group of the general formula II

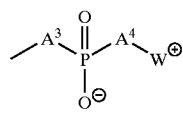

in which the moieties $A^3$ and $A^4$, which are the same or different, are $-O-$, $-S-$, $-NH-$, or a valence bond, and W+ is a group comprising an ammonium, phosphonium or sulphonium cationic group and a group linking the anionic and cationic moieties.

3. A polymerisation process according to claim 2 in which X is a group of general formula III

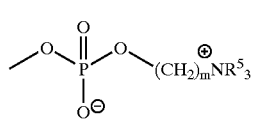

where the groups $R^5$ are the same or different and each is hydrogen or $C_{1-4}$ alkyl, and is from 1 to 4.

4. A polymerisation process according to claim 1 in which X is a group having the general formula IV

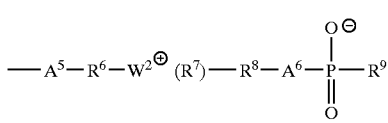

in which $A^5$ is a valence bond, —O—, —S— or —NH—;
$R^6$ is selected from the group consisting of a valence bond (together with $A^3$), alkanediyl, —C(O)alkylene- and —C(O)NH alkylene;
$W_6$ is S, $PR^7$ or $NR^7$;
the or each groups $R^7$ is hydrogen or alkyl of 1 to 4 carbon atoms or the two groups together with the heteroatom to which they are attached form a heterocyclic ring of 5 to 7 atoms;
$R^8$ is alkyanediyl of 1 to 20 carbon atoms;
$A^6$ is a bond, NH, S or O; and
$R^9$ is selected from the group consisting of hydroxyl, $C_{1-12}$ alkyl, $C_{1-12}$ alkoxy, $C_{1-18}$ aralkyl, $C_{7-18}$ aralkoxy, $C_{6-18}$ aryl and $C_{6-18}$ aryloxy group.

5. A polymerisation process according to claim 4 in which
$A^5$ is a bond,
$R^6$ is a $C_{2-6}$ alkanediyl;
$W^2$ is $NR^7$;
each $R^7$ is $C_{1-4}$ alkyl;
$R^8$ is $C_{2-6}$ alkanediyl;
$A^6$ is O; and
$R^9$ is $C_{1-4}$ alkoxy.

6. A polymerisation process according to claim 1 in which Y is $H_2C=CR-CO-A$- in which R is hydrogen or methyl and A is O.

7. A polymerisation process according to claim 1 in which B is a straight chain $C_{2-6}$-alkanediyl.

8. A polymerisation process according to claim 1 in which the zwitterionic monomer is 2-methacryloyloxyethyl-2'-trimethylammonium ethyl phosphate inner salt.

9. A polymerisation process according to claim 9 in which the polymerisation mixture contains a non-polymerisable solvent.

10. A polymerisation process according to claim 9 in which the solvent comprises water.

11. A polymerisation process according to claim 1 in which the ethylenically unsaturated monomer includes at least one comonomer, selected from anionic, cationic and non-ionic monomers.

12. A polymerisation process according to claim 11 in which the comonomer is immiscible with the zwitterionic monomer, and in which the polymerisation mixture comprises a non-polymerisable solvent in which both the zwitterionic monomer and the comonomer are soluble.

13. A polymerisation process according to claim 12 in which the solvent includes water and a water-miscible organic solvent.

14. A polymerisation process according to claim 1 which is an atom or group transfer radical polymerisation.

15. A polymerisation process according to claim 14, in which the initiator has a radically transferable atom or group, and the catalyst comprises a transition metal compound and a ligand, in which the transition metal compound is capable of participating in a redox cycle with the initiator and dormant polymer chain, and the ligand is either any N—, O—, P— or S— containing compound which can coordinate with the transition metal atom in a σ-bond, or any carbon-containing compound which can coordinate with the transition metal in a π-bond, such that direct bonds between the transition metal and growing polymer radicals and not formed.

16. A polymerisation process according to claim 15 in which the initiator is of the general formula V $$R^{11}R^{12}R^{13}C-X^2 \qquad V$$

where:
$X^2$ is selected from the group consisting of Cl, Br, I, $OR^{10}$, $SR^{14}$, $SeR^{14}$, $OP(=O)R^{14}$, $OP(=O)(OR^{14})_2$ and S—C$(=S)N(R^{14})_2$, where $R^{10}$ is alkyl of from 1 to 20 carbon atoms in which each of the hydrogen atoms may be independently replaced by halide, $R^{14}$ is aryl or a straight or branched $C_1-C_{20}$ alkyl group, and where an $N(R^{14})_2$ group is present, the two $R^{14}$ groups may be joined to form a 5- or 6-membered heterocyclic ring; and
$R^{11}$, $R^{12}$ and $R^{13}$ are each independently selected from the group consisting of H, halogen, $C_1-C_{20}$ alkyl, $C_3-C_8$ cycloalkyl, $C(=O)R^{15}$, $C(=O)NR^{16}R^{17}$, COCl, OH, CN, $C_2-C_{20}$ alkenyl, $C_2-C_{20}$ alkenyl oxiranyl, glycidyl, aryl, heterocyclyl, aralkyl, aralkenyl, $C_1-C_6$ alkyl in which from 1 to all of the hydrogen atoms are placed with halogen, and $C_1-C_6$ alkyl substituted with from 1 to 3 substituents selected from the group consisting of $C_1-C_4$ alkoxy, aryl, heterocyclyl, $C(=O)R^{15}$, $C(=O)NR^{16}R^{17}$, $-C^{12}R^{13}X^2$, oxiranyl and glycidyl;
where $R^{15}$ is selected from the group consisting of alkyl of from 1 to 20 carbon atoms, alkoxy of from 1 to 20 carbon atoms, oligo(alkoxy) in which each alkoxy group has 1 to 3 carbon atoms, aryloxy and heterocyclyloxy any of which groups may have substituents selected from optionally substituted alkoxy, oligoalkoxy, amino (including mono- arid di-alkyl amino and trialkyl ammonium, which alkyl groups, in turn may have substituents selected from acyl, alkoxycarbonyl, alkenoxycarbonyl, aryl and hydroxy) and hydroxyl groups; and
$R^{16}$ and $R^{17}$ are independently H or alkyl of from 1 to 20 carbon atoms which alkyl groups, in turn may have substituents selected from the group consisting of acyl, alkoxycarbonyl, alkenoxycarbonyl, aryl and hydroxy, or $R^{16}$ and $R^{17}$ may be joined together to form an alkanediyl group of from 2 to 5 carbon atoms, thus forming a 3- to 6-membered ring;
such that not more than of $R^{11}$, $R^{12}$ and $R^{13}$ are H.

17. The process of claim 16, wherein no more than one of $R^{11}$, $R^{12}$ and $R^{13}$ is H.

18. A polymerisation process according to claim 16 n which $X^2$ is selected from the group consisting of Cl, Br and I.

19. A polymerisation process according to claim 16 in which $R^{11}$ and $R^{12}$ are each methyl and $R^{13}$ is —CO—$R^{15}$ in which $R^{15}$ is oligoalkoxy.

20. A polymerisation process according to claim 15 in which the transition metal compound has the formula $M_t^{n+} X'_n$, where:

$M_t^{n+}$ is selected from the group consisting of $Cu^{1+}$, $Cu^{2+}$, $Fe^{2+}$, $Fe^{3+}$, $Ru^{2+}$, $Ru^{3+}$, $Cr^{2+}$, $C^{3+}$, $Mo^{2+}$, $Mo^{3+}$, $W^{2+}$, $W^{3+}$, $Mn^{2+}$, $Mn^{3+}$, $Mn^{4+}$, $Rh^{3+}$, $Rh^{4+}$, $Re^{2+}$, $Re^{3+}$, $Co_+$, $Co_{2+}$, $Co^{3+}$, $V^{2+}$, $V^{3+}$, $Zn^+$, $Zn^{2+}$, $Ni^{2+}$, $Ni^{3+}$, $A^+$, $Au^{2+}$, $Ag^+$ and $Ag^{2+}$;

X' is selected from the group consisting of halogen, $C_{12}$–$C_6$-alkoxy, $(SO_4)_{1/2}$, $(PO^4)_{1/3}$, $(R^{18}PO_4)_{1/2}$, $(R^{18}PO_4)$, inflate, hexafluorophosphate, methanesulphonate, arylsulphonate, CN and $R^{19}CO_2$, where $R^{18}$ is aryl or a straight or branched $C_{1-20}$ alkyl and $R^{19}$ is H or a straight or branched $C_1$–$C_6$ alkyl group which may be substituted from 1 to 5 times with a halogen; and n is the formal charge on the metal (0 $\subset$ n £7).

21. A polymerisation process according to claim 20 in which the metal compound is CuHal or RuHal$_2$ where Hal is chlorine or bromine.

22. A polymerisation process according to claim 20, wherein said ligand is selected from the group consisting or:

a) compounds of the formulas:

$R^{20}$-Z-$R^{21}$ and $R^{20}$-Z-$(R^{22}$-Z$)_m$—R where:

$R^{20}$ and $R^{21}$ are independently selected from the group consisting of H, $C_1$–$C_{20}$ alkyl, aryl, heterocyclyl, $C_1$–$C_6$, alkoxy, $C_1$–$C_4$ dialkylamino, C(=O)$R^{22}$, C(=O)$R^{23}R^{24}$ and $A^7$C(=O)$R^{25}$, where $A^7$ may be $NR^{26}$ or O; $R^{22}$ is selected from the group consisting of alkyl of from 1 to 20 carbon atoms, aryloxy or heterocyclyloxy; $R^{23}$ and $R^{24}$ are independently H or alkyl of from 1 to 20 carbon atoms or $R^{23}$ and $R^{24}$ may be joined together to form an alkanediyl group of from 2 to 5 cat ban atoms, thus forming a 3- to 6-membered ring; $R^{25}$ is selected from the group consisting of H, straight and branched $C_1$–$C_{20}$ alkyl and aryl and $R^{26}$ is selected from the group consisting of hydrogen, straight and branched $C_{1-20}$-alkyl and aryl; or $R^{20}$ and $R^{21}$ may be joined to form, together with Z, a saturated or unsaturated ring;

Z is O, S, $NR^{27}$ or $PR^{27}$, where $R^{27}$ is selected from the same group as $R^{20}$ and $R^{21}$, and where Z is $PR^{27}$, $R^{27}$ can also be $C_1$–$C_{20}$ alkoxy or Z may be a bond $CH_2$ at a fused ring, where one or both of $R^{20}$ and $R^{21}$ is heterocyclyl, each $R^{22}$ is independently a divalent group selected from the group consisting of $C_1$–$C_8$ cycloalkanediyl, $C_1$–$C_8$ cycloalkenediyl, arenediyl and heterocyclylene where the covalent bonds to each Z arc at vicinal positions or may be joined to one or both of $R^{20}$ and $R^{21}$ to formulate a heterocyclic ring system; and m is from 1 to 6;

b) CO;

c) porphyrins and porphycenes, which may be substituted with from 1 to 6 halogen atoms, $C_{1-6}$ alkyl groups, $C_{1-6}$-alkoxy groups, $C_{1-6}$ alkoxycarbonyl, aryl groups, heterocyclyl groups, and $C_{1-6}$ alkyl groups further substituted with from 1 to 3 halogens;

d) compounds of the formula $R^{23}R^{24}C(C=O)R^{25})_2$, where $R^{25}$ is $C_{1-20}$ alkyl, $C_{1-20}$ alkoxy, aryloxy or heterocyclyloxy; and each of $R^{23}$ and $R^{24}$ is independently selected from the group consisting of H, halogen, $C_{1-20}$ alkyl, aryl and heterocyclyl, and $R^{23}$ and $R^{24}$ may be joined to form a $C_{1-8}$ cycloalkyl ring or a hydrogenated aromatic or heterocyclic ring, of which the ring atoms may be further substituted with 1 to 5 $C_{1-6}$ alkyl groups, $C_{1-6}$ alkoxy groups, halogen atoms, aryl groups, or combinations thereof; and e) arenes and cyclopentadienyl ligands, where said cyclopentadienyl ligand may be substituted with from one to five methyl groups, or may be linked through and ethylene or propylene chain to a second cyclopentadienyl ligand.

23. A polymerisation process according to claim 22 in which the ligand is selected from the group consisting of bipyridine, triphenylphosphine, 1,1,4,7,10,10-hexamethyl-triethylene tetramine, and

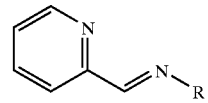

where R is an alkyl or substituted alkyl group, in which the substituent is selected from the group consisting of amino, including alkylamino and acylamino, alkoxy, hydroxy, acyl, acyloxy, alkoxycarbonyl, heterocyclyl and ionic groups, and halogen atoms.

24. A polymerisation process according to claim 1 in which the molar ratio of initiator to ethylenically unsaturated monomer is an the range 1:(5 to 500).

25. A polymerisation process according to claim 1 in which the polymer product has an average degree of polymerisation in the range 5 to 500.

26. A polymerisation process according to claim 1 in which the polydispersity of molecular weight of the polymer product is less than 1.5.

27. A polymerisation process according to claim 1 which is carried out until the level of residual ethylenically unsaturated monomer is less than 5%.

28. A polymerisation process according to claim 27 in which the initial polymer product is subjected to a second step of living radial polymerisation in which further ethylenically unsaturated monomer is contacted with the initial polymer product which acts as initiator in the presence of a catalyst, to form a block copolymer product.

29. A polymerisation process according to claim 28 which the initial polymer product is not isolated from the product mixture before the second step.

30. A polymerisation process according to claim 29 in which the further monomers are added to the product mixture of the first step as a solution in a solvent which is miscible with the said product mixture.

31. A polymerisation process according to claim 28 in which the initial polymer product is isolated from the catalyst of the first step, and in which a different catalyst is used in the second step.

32. A polymerisation process according to claim 28 which the first polymerisation is conducted in the presence of a non-polymerisable solvent and in which the initial polymer product is isolated from the solvent, and in which the second step is conducted in the absence of a non-polymerisable solvent or in the presence of a non-polymerisable solvent different from or the same as the solvent used in the first step.

33. A polymerisation process according to claim 2 in which $W^+$ is a group of formula

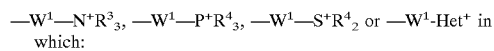

in which:

W¹ is selected from the group consisting of alkanediyl of 2–6 carbon atoms optionally containing one or more ethylenically unsaturated double or triple bonds, disubstituted-aryl (arylene), alkylene arylene, arylene alkylene, alkylene aryl alkylene, cycloalkenediyl, alkylene cycloalkyl, cycloalkyl alkylene and alkylene cycloalkyl alkylene, which group W¹ optionally contains one or more fluorine substituents and/or one or more functional groups; and either the groups $R^3$ are the same or different and each is selected from the group consisting of hydrogen, alkyl of 1 to 4 carbon atoms or aryl, such as phenyl, or two of the groups $R^3$ together with the nitrogen atom to which they are attached form an aliphatic heterocyclic ring containing from 5 to 7 atoms, or the three groups $R^3$ together with the nitrogen atom to which they are attached form a fused ring structure containing from 5 to 7 atoms in each ring, and optionally one or more of the groups $R^3$ is substituted by a hydrophilic functional group, and the groups $R^4$ are the same or different and each is $R^3$ or a group $OR^3$, where $R^3$ is as defined above; or Het is an aromatic nitrogen-, phosphorus- or sulphur-, containing ring.

34. A polymerisation process according to claim 33 which $W^+$ is a group $-W^1-N^+R_3$, $W^1$ is $C_{2-6}$ alkanediyl, and each $R^3$ is $C_{1-4}$ alkyl.

35. A polymerisation process according to claim 3 each $R^5$ is methyl.

36. A polymerisation process according to claim 10 in which water is present in an amount in the range 10 to 100% by weight based on the weight of ethylenically unsaturated monomer.

37. A polymerisation process according to claim 15 in which the metal compound is CuHal or $RuHal_2$ where Hal is chlorine or bromine, and the ligand is selected from the group consisting of bipyridine, triphenylphosphine, 11,4,7,10,10-hexamethyl-triethylene tetramine, and

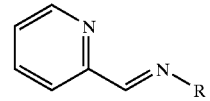

where R is an alkyl or substituted alkyl group, in which the substituent is selected from the group consisting of amino, including alkylamino and acylamino, alkoxy, hydroxy, acyl, acyloxy, alkoxycarbonyl, heterocyclyl and ionic groups, and halogen atoms.

38. A polymerisation process according to claim 1 in which the molar ratio of initiator to ethylenically unsaturated monomer is in the range 1:(10 to 100).

39. A polymerisation process according to claim 15 which the molar ratio of initiator to ethylenically unsaturated monomer is in the range 1:(10 to 100).

* * * * *